US011909116B1

(12) United States Patent
Simon et al.

(10) Patent No.: US 11,909,116 B1
(45) Date of Patent: Feb. 20, 2024

(54) MONOHEDRAL TILED ANTENNA ARRAYS

(71) Applicant: Cobham Advanced Electronic Solutions Inc., Arlington, VA (US)

(72) Inventors: Michael Jason Simon, Colorado Springs, CO (US); Michael Scott Pors, Saratoga, CA (US); Bryan Kathol, Lakeside, CA (US)

(73) Assignee: CAES SYSTEMS LLC, Arlington, VA (US)

( * ) Notice: Subject to any disclaimer, the term of this patent is extended or adjusted under 35 U.S.C. 154(b) by 0 days.

(21) Appl. No.: 17/994,741

(22) Filed: Nov. 28, 2022

Related U.S. Application Data

(63) Continuation of application No. 17/667,663, filed on Feb. 9, 2022, now Pat. No. 11,532,893.

(60) Provisional application No. 63/166,222, filed on Mar. 25, 2021.

(51) Int. Cl.
*H01Q 21/00* (2006.01)
*H01Q 1/02* (2006.01)
*H01Q 1/22* (2006.01)
*H01Q 1/38* (2006.01)

(52) U.S. Cl.
CPC ........... *H01Q 21/0025* (2013.01); *H01Q 1/02* (2013.01); *H01Q 1/2283* (2013.01); *H01Q 1/38* (2013.01)

(58) Field of Classification Search
CPC .... H01Q 21/0025; H01Q 1/02; H01Q 1/2283; H01Q 1/38
See application file for complete search history.

(56) References Cited

U.S. PATENT DOCUMENTS

2012/0268344 A1 10/2012 McCarthy
2014/0210668 A1* 7/2014 Wang ........................ H01Q 3/34 342/372
2017/0331176 A1 11/2017 Levy et al.
2019/0013592 A1* 1/2019 West ........................ H01Q 3/46

FOREIGN PATENT DOCUMENTS

JP 2008-066936 3/2021

OTHER PUBLICATIONS

International Search Repot and Written Opinion for PCT/US2022/015737 (ISA/EP) dated Jul. 8, 2022 (21 pages).
Rocca, Paolo "*Modular Design of hexagonal Phased Arrays through Diamond Tiles*" IEEE Transactions on Antennas and Propagation, Feb. 3, 2021 (15 pages).
Alshammary et al., "*Grating Lobe Suppression in Rotationally Tiled Arrays*" Mar. 19, 2017, 11$^{th}$ European Conference on Antennas and Propagation (EUCAP) (4 pages).

* cited by examiner

*Primary Examiner* — David E Lotter
(74) *Attorney, Agent, or Firm* — ALSTON & BIRD LLP

(57) ABSTRACT

An antenna array includes one or more antenna tiles which are arranged on an antenna plane. Each of the one or more antenna tiles includes one or more antenna units that are arranged together to form the respective antenna tile having a hexagonal shape and each antenna unit comprises an antenna circuit chip. In some embodiments, each antenna unit has a pentagonal shape and the antenna tile has a hexagonal shape formed by tessellating the one or more antenna units with one another.

20 Claims, 23 Drawing Sheets

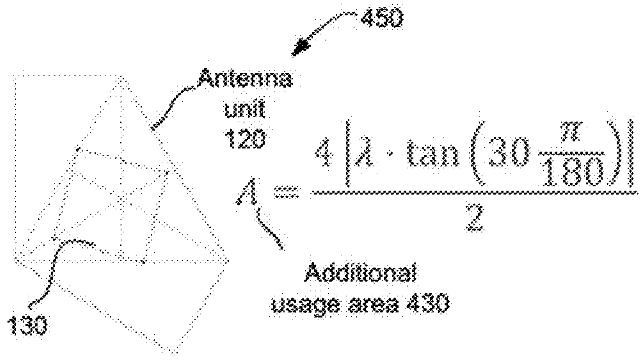

$$A = \frac{4\left|\lambda \cdot \tan\left(30\frac{\pi}{180}\right)\right|}{2}\lambda - \left(\frac{\lambda}{2}\right)^2 = 2\left|\lambda^2 \cdot \tan\left(30\frac{\pi}{180}\right)\right| - \frac{\lambda^2}{4} = 8.1310\text{x}10^{-4}$$

Figure 4B

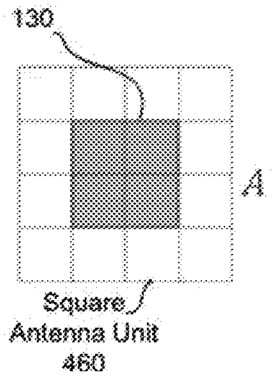

$$A = \lambda^2 - \left(\frac{\lambda}{2}\right)^2 = \lambda^2 - \frac{\lambda^2}{4} = \lambda^2\left(1 - \frac{1}{4}\right) = \frac{3\lambda^2}{4} = 6.7407\text{x}10^{-4}$$

PRIOR ART

Figure 4C

$$Ratio = \frac{\left(2\left|\lambda^2 \cdot \tan\left(30\frac{\pi}{180}\right)\right| - \frac{\lambda^2}{4}\right)}{\frac{3\lambda^2}{4}} = 1.2063$$

Figure 4D

PRIOR ART

600

700

1200

1200

1400

| Farfield (f=37) | [Simulation_1] |
|---|---|
| Type | Farfield |
| Approximation | enabled (kR > > 1) |
| Component | Abs |
| Output | Directivity |
| Frequency | 37 GHz |
| Rad. Efficiency | 0.1362 dB |
| Tot. Efficiency | -2.235 dB |
| Dir. | 24.34 dBi |

| | |
|---|---|
| Farfield (f=37) | [Simulation_1] |
| Type | Farfield |
| Approximation | enabled (kR >> 1) |
| Component | Abs |
| Output | Directivity |
| Frequency | 37 GHz |
| Rad. Efficiency | 0.1362 dB |
| Tot. Efficiency | -2.235 dB |
| Dir. | 24.34 dBi |

Frequency = 37 GHz
Main Lobe Magnitude = 24.3 dBi
Main Lobe Direction = 0.0 deg.
Angular Width (3 dB) = 7.3 deg.
Side lobe level = -11.4 dB

MONOHEDRAL TILED ANTENNA ARRAYS

CROSS-REFERENCE TO RELATED APPLICATIONS

The present application is a continuation of U.S. application Ser. No. 17/667,663, filed Feb. 9, 2022, which claims benefit of U.S. Provisional Application No. 63/166,222, filed Mar. 25, 2021, respectively, which are incorporated herein by reference in their entirety.

TECHNICAL FIELD

The disclosed embodiments relate generally to antenna technology, including but not limited to methods and systems associated with a directional antenna array with monohedral tiling of antenna units, where each unit accommodates additional functional components (e.g., interconnects, connectors, active and passive electronic devices, and heat sinks).

BACKGROUND

Multiple antenna units are often connected to work as a single antenna or an antenna array for receiving or transmitting radio waves. In such an antenna or antenna array, individual antenna units are controlled with correlated phases to create a steerable beam of radio waves pointing in different directions without moving the antenna array. Each antenna unit has a dimension consistent with a frequency of the associated radio waves. However, it has been a challenge to integrate multiple mechanical, electrical, and thermal functional components within a limited space of each antenna unit. Some of the functional components of each antenna unit have to be moved out of the antenna unit and disposed remotely on an antenna level, which introduces undesirable electrical parasitics and assembly complexity to the antenna. It would be beneficial to develop cost-effective antenna arrays that have sufficient local space in each antenna unit for accommodating additional functional components (e.g., interconnects, connectors, active and passive electronic devices, and heat sinks) while preserving or enhancing a high gain and low sidelobes of the antenna array.

BRIEF SUMMARY

Various implementations of systems, methods and devices within the scope of the appended claims provide a customizable, scalable, and cost effective antenna, e.g., an antenna including one or more antenna tiles formed by one or more antenna units having a pentagon. In particular, the antenna is configured to scale infinitely in in-plane directions of the antenna as one tile geometry is tessellated along the in-plane directions. In some embodiments, the antenna array is configured to operate in any of the X-Band (8-12 GHz), the Ku-Band (12-18 GHz), the K-Band (18-27 GHz), the Ka-Band (27-40 GHz), the V-Band (40-75 GHz) and the W-Band (75-110 GHz) frequency ranges. The antenna array allows for frequency increases from the X-Band, to the Ku-Band, K-Band, Ka-Band, to the V-Band, and then to the W-Band. Further, the antenna is configured to meet antenna design goals and allows for testing and calibration at the tile level prior to antenna integration, which can drastically reduce calibration and rework costs.

In example embodiments, an antenna tile is disclosed, wherein the antenna array includes one or more antenna units, wherein each antenna unit has a pentagonal shape, and the antenna tile has a hexagonal shape formed by tessellating the one or more antenna units with one another.

In some embodiments, the one or more antenna units include a first antenna unit, a second antenna unit, and a third antenna unit. In some embodiments, the second antenna unit is substantially identical to the first antenna unit and the third antenna unit is substantially identical to the first antenna unit and second antenna units.

In some embodiments, each antenna unit has at least one of a pentagonal shape, a rhombus shape, a kite shape, or a trapezoidal shape.

In some embodiments, each antenna unit has a convex pentagonal shape and the antenna tile has a convex hexagonal shape.

In some embodiments, the pentagon shape of an antenna unit has a surface area that comprises one third of the hexagonal shape of the antenna tile.

In some embodiments, each antenna unit comprises one or more antenna circuit chips and each antenna circuit chip comprises one or more antenna elements. In some embodiments, each antenna circuit chip comprises at least four antenna elements. In some embodiments, the antenna circuit chip is disposed at a center of the respective antenna unit. In some embodiments, the antenna circuit chip is disposed such that a first corner is disposed adjacent to a corner of the antenna unit and the corner of the antenna unit corresponds to a corner at the center of the antenna tile, and a second corner is disposed adjacent to a middle point of a side of the antenna unit corresponding to the side opposite the center of the antenna tile. In some embodiments, the antenna circuit chip is disposed such that a first side is disposed adjacent to a corner of the antenna unit and the corner of the antenna unit corresponds to a corner at the center of the antenna tile, and a second side is disposed adjacent to and substantially parallel to a middle point of a side of the antenna unit corresponding to the side opposite the center of the antenna tile.

In some embodiments, each antenna unit comprises one or more ports and each of the one or more ports are disposed at an open area external to an antenna circuit chip. In some embodiments, the one or more ports include at least one or a power and control port or a radio frequency port.

In some embodiments, each antenna unit is configured with a heat sink, and the heat sink comprises one or more fluid cooling inlets, one or more fluid cooling outlets, a fluid cooling chamber and one or more fluid channels fluidically coupled to the one or more fluid cooling inlets, the fluid cooling outlet, and the fluid cooling chamber. In some embodiments, at least one of the one or more fluid cooling inlets or one or more fluid cooling outlets are coupled to one or more pumps configured to promote the flow of cooling fluid throughout the heat sink.

In example embodiments, an antenna array is disclosed, wherein the antenna array includes one or more antenna tiles and the one or more antenna tiles are arranged on an antenna plane, each antenna tile comprises one or more antenna units that are arranged together to form the respective antenna tile having a hexagonal shape, and each antenna unit comprises an antenna circuit chip.

In some embodiments, each antenna tile comprises three separate and distinct antenna units tessellated together.

In some embodiments, each antenna tile has a convex hexagonal shape, and each antenna unit comprising the antenna tile has a pentagonal shape.

In some embodiments, one or more sides of the antenna array have a length consistent with a characteristic frequency of the antenna array. In some embodiments, the characteristic frequency is based at least in part on a desired wavelength of radio frequency signals to be received or transmitted by antenna array elements of the antenna array.

In some embodiments, each antenna tile has a concave hexagonal shape.

In some embodiments, the antenna plane is flat.

In some embodiments, the antenna plane is curved in one or more dimensions.

In some embodiments, an antenna board configured to provide the antenna plane, wherein the one or more antenna tiles are assembled on the antenna board.

In some embodiments, each antenna tile is electrically coupled to at least one of the antenna board or one or more other antenna tiles.

In some embodiments, each antenna unit of an antenna tile is electrically coupled to at least one of the antenna board, the one or more other antenna units of the antenna tile, or one or more other antenna units of an adjacent antenna tile.

In some embodiments, the antenna array operates within an X-Band, a Ku-Band, a K-Band, a Ka-Band, a V-Band, or a W-Band frequency range.

In some embodiments, the antenna array has a scan angle up to positive 60 degrees or negative 60 degrees off an associated boresight.

In some embodiments, the antenna array has a half-power beam width (HPBW) less than 6 degrees.

In some embodiments, the antenna array includes at least a first antenna tile and a second antenna tile, and the first antenna tile and second antenna tile have substantially the same dimensions.

In some embodiments, the antenna array includes at least a first antenna tile and a second antenna tile, and the first antenna tile and second antenna tile have different dimensions.

In example embodiments, an antenna is disclosed, wherein the antenna an antenna unit having a polygon shape that is configured to form the basis of a monohedral tiling arrangement of identical antenna units.

In some embodiments, the antenna unit has a convex polygon shape.

In some embodiments, the antenna unit has a concave polygon shape.

In some embodiments, the antenna unit a single antenna unit.

In some embodiments, the antenna unit is a first antenna unit and the antenna further includes one or more additional antenna units substantially identical to the first antenna unit.

In some embodiments, the first antenna unit and the one or more additional antenna units are tessellated with one another so as to form discrete antenna tiles.

In some embodiments, each discrete antenna tile is tessellated with one or more other antenna tiles so as to form a discrete antenna array.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the subject matter described herein.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features as the person of skill in this art will appreciate upon reading this disclosure.

FIGS. 4A-D are geometric diagrams applied to determine one or more geometric parameters of the antenna unit and the antenna circuit chip, in accordance with some embodiments.

Figure 1:
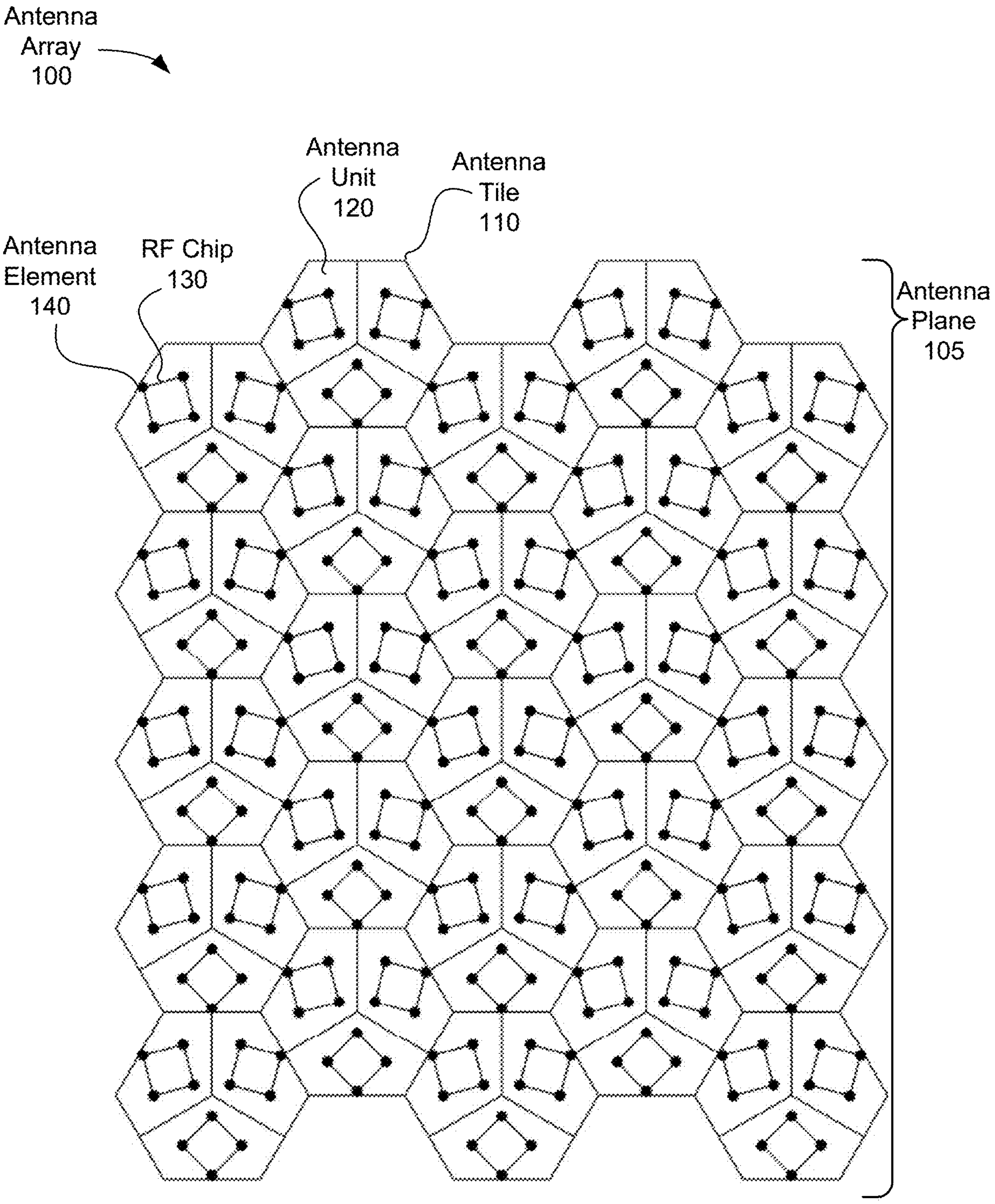
FIG. 1 is a top view of an antenna array, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as to avoid obscuring pertinent aspects of the embodiments described herein.

In some implementations of this application, an antenna (also called antenna array when it includes more than one antenna unit) includes an antenna unit having a pentagonal shape and configured to be arranged with one or more additional antenna units to form an antenna tile having a hexagonal shape. In some embodiments, the antenna further includes at least one additional antenna tile that is substantially identical to the antenna tile, i.e., monohedral tiling of the antenna tiles of the hexagonal shape is applied to form the antenna. Alternatively, in some embodiments, the antenna further includes at least one additional antenna tile that is different from the antenna tile is applied to form the antenna such that the antenna may perform multi-frequency band operations. Further, in some embodiments, the antenna tiles of the same orientation fit to one another to form the antenna. In each antenna tile, the antenna units are identical, and however, arranged according to different orientations to form the respective antenna tile. The shape of each antenna unit is configured to accommodate both an antenna circuit chip and additional functional components, e.g., power and data interconnects, power and data connectors, cooling channels and connectors, and heat sinks.

In some situations, monohedral equilateral triangle and square tiles are used to create planar Active Electronically Scanned Arrays (AESAs), as these polygons can be naturally tessellate with each other, and can be used to expand the AESAs infinitely in their in-plane directions. In an example, individual antenna elements configured to receive and transmit radio waves are optionally disposed at centers of these monohedral equilateral tiles. Adjacent centers of the equilateral triangle tiles can be connected to form equilateral triangles, and adjacent centers of the square tiles can be connected to form squares. In such monohedral tiling, each antenna element is connected to one or more electronic devices (e.g., formed in Integrated Circuit (IC)) for phase shifting, time delay, and/or amplification. Such equilateral triangle and square tiles need to provide a tile space to support additional functional components.

FIG. 1 is a top view of an antenna array 100, in accordance with some embodiments. The antenna array 100 includes one or more antenna tiles 110 that are arranged on an antenna plane 105. The antenna plane 105 can be provided by an antenna board (e.g., a Printed Circuit Board (PCB) board (not shown) behind the antenna plane). Each antenna tile includes one or more separate and distinct antenna units 120 that, when are arranged together, form the respective antenna tile 110. Further, each antenna unit 120 includes an antenna circuit chip 130 and one or more ports (shown and discussed below in FIGS. 2A-2C). In some embodiments, the antenna plane 105 is flat. Conversely, in some embodiments, the antenna plane 105 is curved in one or more dimensions. In some embodiments, the antenna array 100 operates within one or more of a X-Band, Ku-Band, K-Band, Ka-Band, V-Band, and/or W-Band frequency range. In some embodiments, the antenna array 100 has a scan angle up to +/−60° and a HPBW less than 6° (theta 0=0°) when operating at the X-Band frequency. In some situations, the HPBW is less than 4° (theta 0=0°) when operating at the Ku-Band. In some situations, the HPBW is less than 3° (theta 0=0°) when operating at the K-Band frequency range. In some situations, the HPBW is less than 2° (theta 0=0°) when operating at the Ka-Band. In some situations, the HPBW is less than 1° (theta 0=0°) when operating at the W-Band. In some embodiments, when the antenna array 100 operates at a given frequency, the antenna array 100 may select one or more of the antenna tiles and/corresponding antenna units to perform the desired operations (e.g., transmit radio waves and/or receive radio waves). The one or more antenna tiles and/or antenna units may be specifically configured to operate at a particular radio wave frequency and/or wavelength.

In some embodiments, the antenna array 100 is formed from tessellating one or more antenna tiles 110 with one another. The one or more antenna tiles 110 are substantially identical. In some embodiments, the one or more antenna tiles 110 are identical. Each antenna tile 110 has a convex hexagonal shape or a concave hexagonal shape. Each antenna tile 110 includes one or more separate and distinct antenna units 120 that, when arranged together, form the respective antenna tile 110. In some embodiments, each antenna tile 110 includes at least three separate and distinct antenna units 120 that are arranged together to form the respective antenna tile 110. For example, as shown in FIG. 2C, an antenna tile 110 can include a first, second, and third antenna unit 120*a*-120*c*, that are substantially identical with one another. A plurality of antenna tiles 110 are tessellated with one another so as to form the antenna tile 110.

In some embodiments, a plurality of antenna units 120, when tessellated with one another, form a discrete antenna tile 110. The plurality of antenna units 120 are configured to closely fit together to form the antenna tile 110. Each antenna unit 120 may be substantially identical to other antenna units 120. In an example, the antenna units 120 includes three identical rhombuses that closely fit into and fill an antenna tile 110 (e.g., tiles 1302 and 1306 in FIG. 13). In another example, the antenna units 120 includes three identical pentagons that closely fit into and fill an antenna tile 110 (e.g., tile 1304 in FIG. 13). Alternatively, in some embodiments, the antenna units 120 in the same tile 110 can be different. For instance, a first antenna unit 120 has a kite shape and two other antenna units are trapezoids that closely fit into and fill an antenna tile 110 (e.g., tile 1310 in FIG. 13) with the kite shape. The kite shaped antenna unit 120 and the two trapezoid shaped antenna units 120 optionally have equal areas. In another example, the antenna units 120 includes three pentagons that closely fit into and fill an antenna tile 110 (e.g., tile 1308 in FIG. 13) and however have at least two different pentagonal shapes. As such, each antenna unit 120 optionally has a pentagon shape, a rhombus shape, a kite shape, and/or a trapezoid shape. The antenna unit 120 can have different monohedral shapes (e.g., a shape from the set of monohedral pentagons). Additionally, each antenna unit 120 optionally has a convex or concave shape, so does each antenna tile 110. Different tessellated configurations of an antenna tile 110 are provided below with reference to FIG. 13.

In some embodiments, each antenna unit 120 includes an antenna circuit chip 130, which includes one or more antenna elements. In some embodiments, each antenna unit 120 includes four antenna elements 140 disposed at four corners of the antenna circuit chip 130. In some embodiments, each antenna circuit chip 130 is disposed at a center of the respective antenna unit 120. Additionally or alternatively, in some embodiments, each antenna circuit chip 130 is aligned with a corner or a side of the antenna unit 120. For example, the antenna unit 120 has a pentagon shape, and the antenna circuit chip 130 has a first corner and a second corner opposing each other. The antenna circuit chip 130 is oriented, such that the first corner is disposed adjacent to a corner of the antenna unit 120 (i.e., a center of the antenna tile 110), and the second corner is disposed adjacent to a middle point of a side of the antenna unit 120 facing the corner of the antenna unit 120. Alternatively, in some embodiments not shown in FIG. 1, a first side of each antenna circuit chip 130 is adjacent to the center of the antenna tile 110, and a second side opposing the first side is adjacent to and substantially parallel to a side of the corresponding antenna unit 120 facing the center of the antenna tile 110. As such, the center of antenna tile 110 is optionally disposed adjacent to a corner or a side of the antenna circuit chip 130.

In some embodiments now shown in FIG. 1, each antenna unit 120 includes one or more ports. For example, the one or more ports can include a power and control port (e.g., SAMTEC stacker 230 in FIG. 2B) or a radio frequency (RF) port (e.g. MMSP (Micro-Mode) connector 240 in FIG. 2B, Corning G4PO connectors). Examples of the MMSP connector 224 include, but are not limited to, MMSP-3526, MMSP-3268 and MMSP-3514. In some embodiments, the one or more ports are disposed at an open area external to a footprint of the antenna circuit chip 130.

As described above, the antenna array 100 is arranged on an antenna plane 105 that is optionally provided by the antenna board, and one or more identical or substantially identical antenna tiles 110 are closely assembled on the antenna board. In some embodiments, each antenna tile 110 is electrically coupled to at least one of the antenna board and/or a subset of antenna tiles 110 to which the antenna tile 110 is immediately adjacent. In some embodiments, each antenna unit 120 of each antenna tile 110 is electrically coupled to at least one of the antenna board, two other antenna units 120 within the same antenna tile 110, and/or a subset of antenna tiles 110 to which the antenna tile 110 is immediately adjacent. In some embodiments, the antenna board includes connectors configured to electrically couple to the one or more ports of an antenna unit 120. The antenna board may comprise various components to facilitate the hosting of signal routing, including but not limited to direct current (DC) power distribution, control signaling, clock distribution, charge storage, bypassing, connector interfaces, and/or the like. The antenna board may be comprised of any suitable material capable of hosting signal routing. For example, the board may be comprised of high frequency optimized FR4 variant thermoset plastic. Radio frequency (RF) signals may be routed on and/or through the antenna board using impedance controlled trace geometries. For example, control signals and clocks may be distributed using phase matched, impedance controlled, differential trace geometries. Examples of the tessellated antenna tiles 110 is provided below with reference to FIGS. 3A and 3B.

In some embodiments, each antenna unit 120 further includes a coolant port, and the coolant port is disposed at an open area of the antenna unit 120 and configured to let a coolant (e.g., air, water) enter and exit the antenna unit 120 to cool the antenna unit 120. Examples of the coolant port are provided below with reference to FIGS. 8-12B.

Figure 2A:
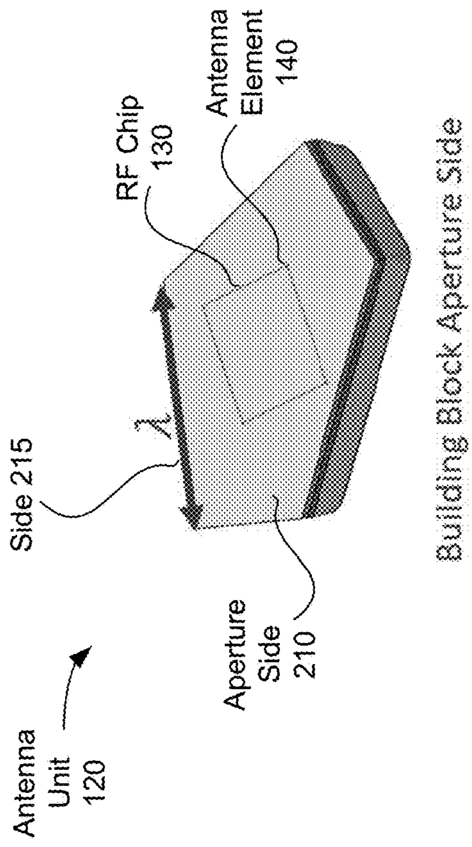
FIG. 2A is a front side perspective view of an antenna unit, in accordance with some embodiments.
Figure 2B:
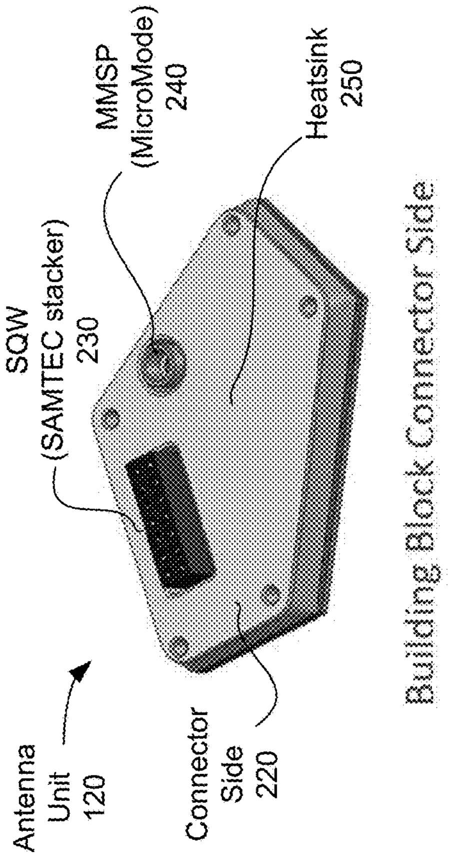
FIG. 2B is a bottom side perspective view of the antenna unit of FIG. 2A.
Figure 2C:
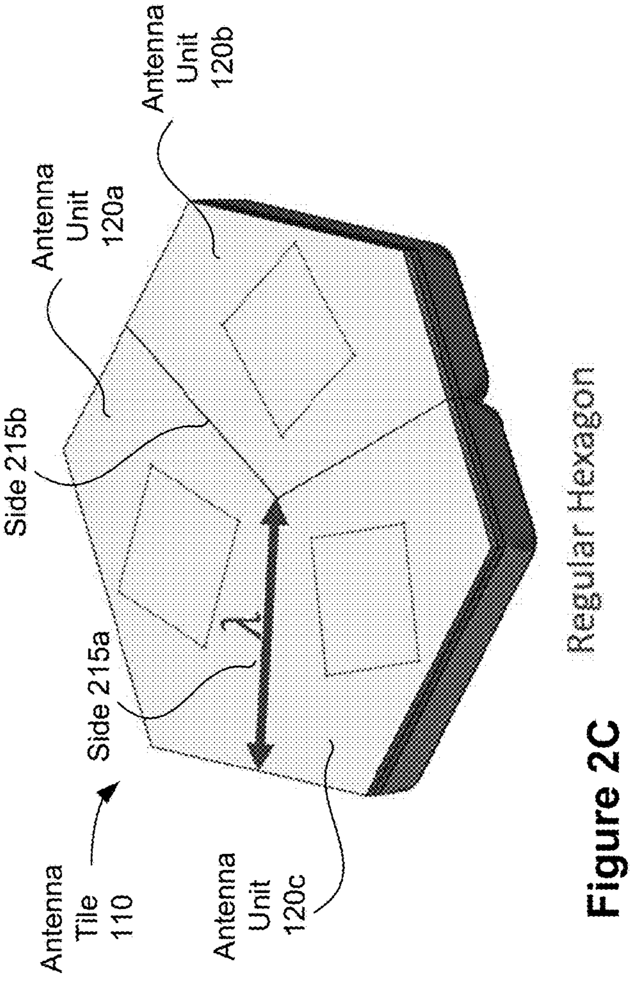
FIG. 2C is a front side perspective view of an antenna tile including a plurality of the antenna units from FIGS. 2A and 2B.

FIGS. 2A and 2B are a front side perspective view and a bottom perspective view of an antenna unit 120, in accordance with some embodiments, respectively. FIG. 2C illustrates an antenna tile 110 including a plurality of antenna units 120, in accordance with some embodiments. FIG. 2A shows an aperture side 210 of the antenna unit 120 from which radio waves are transmitted or received by one or more antenna elements. In the antenna unit 120, the one or more antenna elements of the antenna unit 120 are coupled to an antenna circuit chip 130 that includes a subset or all of an radio frequency (RF) front end (i.e., a transmitter/receiver chip). The RF front end includes a RF transmitter front end and an RF receiver front end. In some situations, the RF front end of the antenna circuit chip 130 generates one or more electrical signals and drives the antenna elements of the antenna unit 120 to emit electromagnetic waves in space, e.g., when a cellular phone transmits a signal toward a satellite in order to place a call or determine a location of the cellular phone via a global positioning system. Conversely, in some embodiments, the antenna elements of the antenna unit 120 receive one or more electromagnetic waves from free space and converts the electromagnetic waves to an RF electrical signal that can be processed by the RF Frontend on the antenna circuit chip 130, e.g., when a radio device receives radio waves and converts the radio waves into an electrical signal that is translated to music outputted from a radio device.

In some embodiments, the subset of the RF front end of the antenna circuit chip 130 are configured for adjusting phase, time delay, and/or relative magnitudes of different signals. Specifically, the antenna circuit chip 130 including the RF front end has one or more of: low pass filters (LPF), intermediate frequency (IF) filters, power amplifiers, oscillators, mixers, digital-to-analog converters (DAC), and analog-to-digital converters (ADC). Additionally, in some embodiments, the antenna circuit chip 130 further includes a power management integrated circuit (PMIC) and/or a baseband circuit in addition to the RF front end. The PMIC is configured to manage power for the antenna unit 120, and the baseband circuit is configured to provide low frequency signals that carry information to be transmitted by the antenna element(s) of the antenna unit 120 and process low frequency signals converted from RF signals received by the antenna element(s). Conversely, in some embodiments, the PMIC, the baseband circuit, and a subset of the RF front end are not integrated on the antenna circuit chip 130, and however, are optionally contained in an additional space of the antenna unit 120 that does not overlap a footprint of the antenna circuit chip 130. More details on electronic components of the antenna unit 120 are discussed below with reference to FIG. 8.

In an example, the antenna circuit chip 130 includes an amplifier chip, e.g., a power amplifier, a low noise amplifier. In some embodiments, each antenna circuit chip 130 includes one or more antenna elements 140. For example, as shown in FIG. 2A, the antenna circuit chip 130 includes four antenna elements 140 at each corner of the antenna circuit chip 130. The antenna circuit chip 130 shown in FIG. 2A is a non-limiting example.

In some embodiments, one or more sides 215 of an antenna unit 120 have a length consistent with a characteristic frequency of the antenna array 100. In some embodiments, the length of the one or more sides 215 of the antenna unit 120 is 3 cm. In some embodiments, the length of the one or more sides 215 of the antenna unit 120 is equal to the wavelength (λ). In other embodiments, the length of the one or more sides 215 of the antenna unit 120 is equal to the wavelength (λ) multiplied by a scaling factor. More details on the length of the one or more sides 215 of the antenna unit 120 is discussed below with reference to FIG. 4.

FIG. 2B shows a connector side 220 of the antenna unit 120 that is opposite the aperture side 210. In some embodiments, the connector side 220 of the antenna unit 120 includes one or more ports and a heat sink 250. The one or more ports include a power and control port (e.g., SAMTEC stacker 230) or an RF port (e.g. MMSP 240). In some embodiments, the power and control port and the RF port can be a single port (which requires signal isolation among different types of signals, e.g., between RF signals and digital control signals). The one or more ports shown in FIG. 2B are non-limiting examples. Any different number of ports can be used depending on the use case.

The heat sink 250 is configured to absorb and dissipate heat generated by the internal components of the antenna unit 120 (e.g., heat generated by the RF front end). In some embodiments, the heat sink 250 is air cooled when the air is circulated over the connector side 220 of the antenna unit 120. Alternatively, in some embodiments, the antenna unit 120 includes one or more cooling ports (e.g., an inlet and an outlet) configured to cool the antenna unit 120 in a controlled manner using a coolant. More details on the one or more cooling ports are discussed below with reference to FIGS. 8-12B.

FIG. 2C shows an antenna tile 110 formed by at least three separate and distinct antenna units 120. For example, the antenna tile 110 is formed by a first antenna unit 120*a*, a second antenna unit 120*b*, and a third antenna unit 120*c* tessellated with one another. The first, second, and third antenna units 120*a*-120*c* fit into and fill the antenna tile 110, i.e., without leaving an unfilled open area (e.g., greater than a threshold size) on the antenna tile 110. In this example, the first and second antenna units 120*a* and 120*b* are substantially identical to one another, and the third antenna unit 120*c* is substantially identical to the first and second antenna units 120*a* and 120*b*. In some embodiments, for each antenna tile 110, two sides (e.g., 215*a* and 215*b*) of each antenna unit 120 connect a center of the antenna tile 110 to sides of the antenna tile 110. The two sides 215*a* and 215*b* are substantially equal and have a length consistent with a characteristic frequency of the antenna array 100. The length of the two sides 215*a* and 215*b* are selected to allow the at least three separate and distinct antenna units 120 of the antenna tile 110 to form a hexagon antenna tile 110 when the antenna units 120 are tessellated with one another.

Figure 3A:
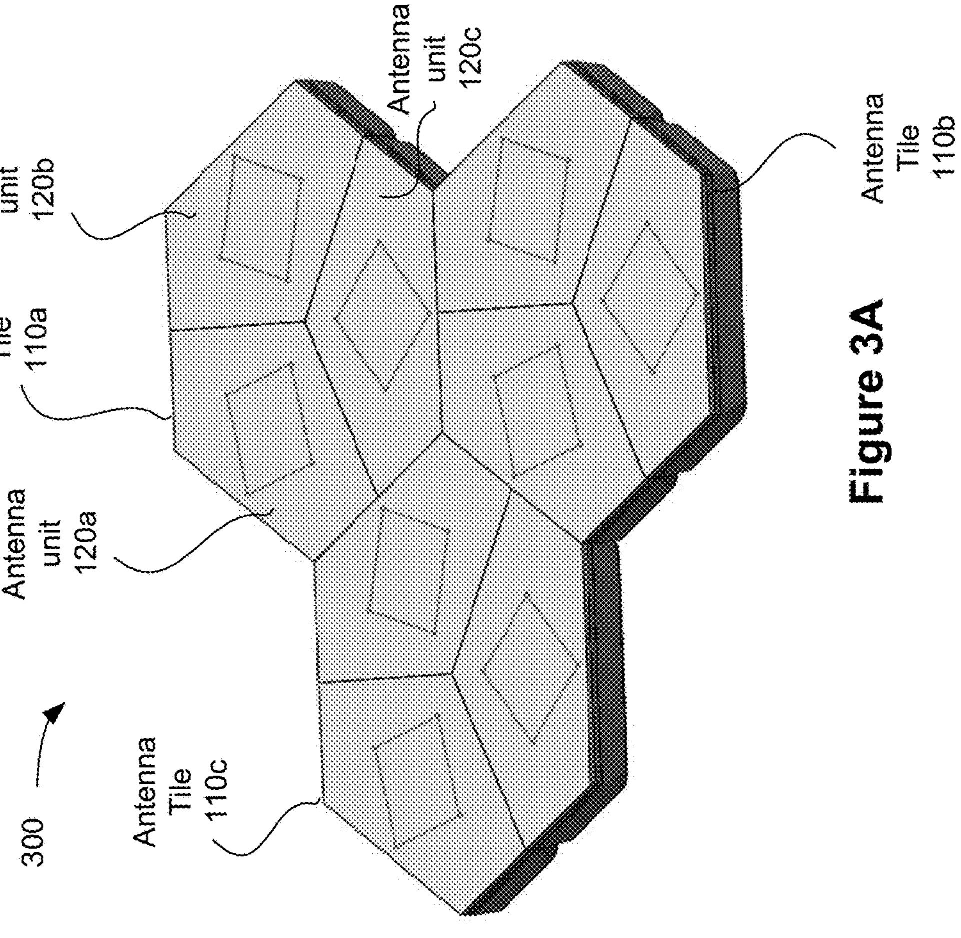
FIGS. 3A and 3B are front side and back side perspective views of an antenna array having tessellated antenna tiles, in accordance with some embodiments, respectively.
Figure 3B:
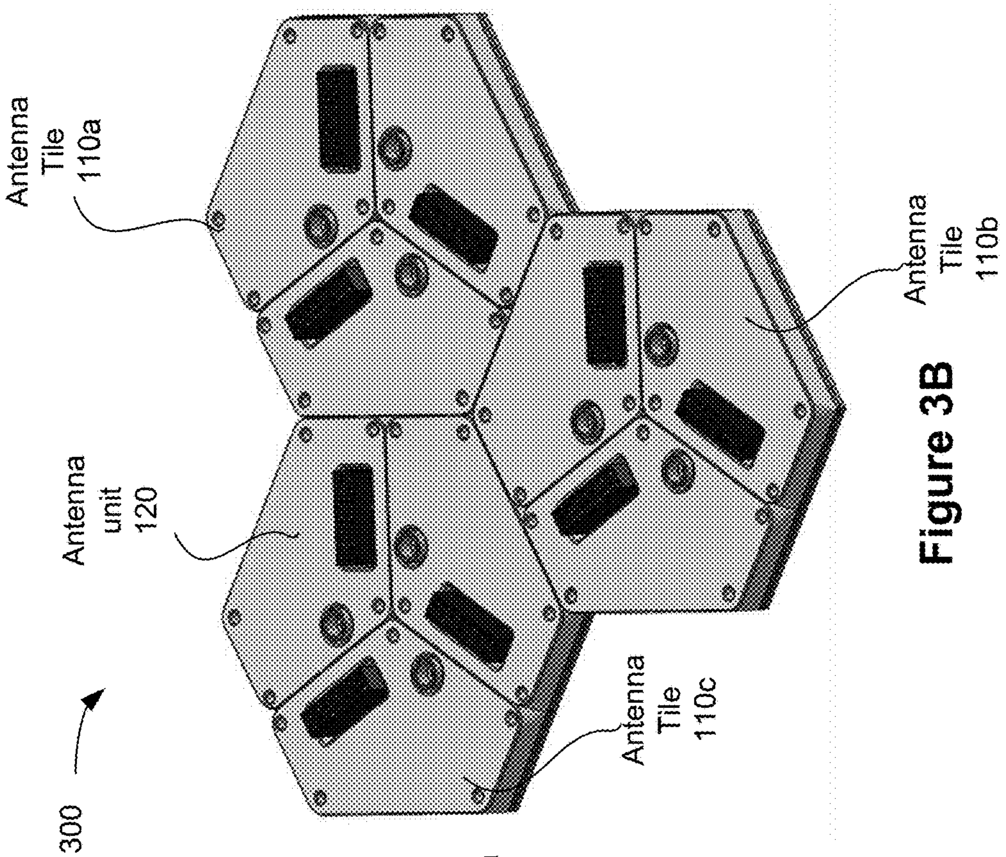

FIGS. 3A and 3B are front side and back side perspective views of an antenna array 300 having tessellated antenna tiles 110, in accordance with some embodiments, respectively. The front side of the antenna array 300 corresponds to the aperture side 210 of the antenna unit 120 where electromagnetic waves are received and transmitted. At least three antenna tiles 110*a*-110*c* are tessellated together to form the antenna array 300, and the antenna array 300 is scalable with a variation of a number of antenna tiles 110 being tessellated in the antenna array 300. In some embodiments, each antenna tile 110*a*-110*c* is electrically coupled to at least one of an antenna board (no shown) and/or a subset of antenna tile 110 to which the antenna tile 110 is immediately adjacent. For example, a first antenna tile 110*a* is electrically coupled to the antenna board or at least the second or third antenna tile 110*b* or 110*c* (which is adjacent to the first antenna tile 110*a*). In some embodiments, for each antenna tile 110*a*-110*c*, each of the three antenna units 120 for each antenna tile 110 is electrically coupled to at least one of the antenna board, two other antenna units 120 within the antenna tile 110, and/or a subset of antenna tiles 110 to which the respective antenna tile 110 is immediately adjacent. For example, the first antenna unit 120*a* of the first antenna tile 110*a* is electrically coupled to the antenna board, the second or third antenna unit 120*b* or 120C, or at least one of the second, third, or any other antenna tiles 110 that are adjacent to the first antenna tile 110*a*.

Referring to FIG. 3B, one or more ports of each antenna unit 120 are exposed and left unobstructed on the back side of the antenna array 300. Each antenna unit 120 is configured to be electrically coupled to at least one of the antenna board and adjacent antenna units 120 (e.g., via the one or one or more ports). In some embodiments, each antenna unit 120 is individually controlled via the one or more ports. In some embodiments, the one or more antenna units 120 of an antenna tile 110 are configured to operate jointly with one another, thereby producing a desired result at the antenna tile 110 as a whole. In some embodiments, each antenna tile 110 is individually controlled via its respective one or more antenna units 120. In some embodiments, the one or more antenna tiles 110 are configured to operate jointly with one another, thereby producing a desired result for the antenna array 100 as a whole. Each antenna unit 120 and/or antenna tile 110 can be individually tested. Each antenna unit 120 can be removed or replaced with another antenna unit 120, e.g., in case of malfunctioning or damaged antenna units 120.

It is noted that the antenna array 300 includes three antenna tiles 110, and one skilled in the art would understand that any different number of antenna tiles 110 can be tessellated together to from an antenna array of a desired size and having desirable electrical and RF performance.

Figure 4A:
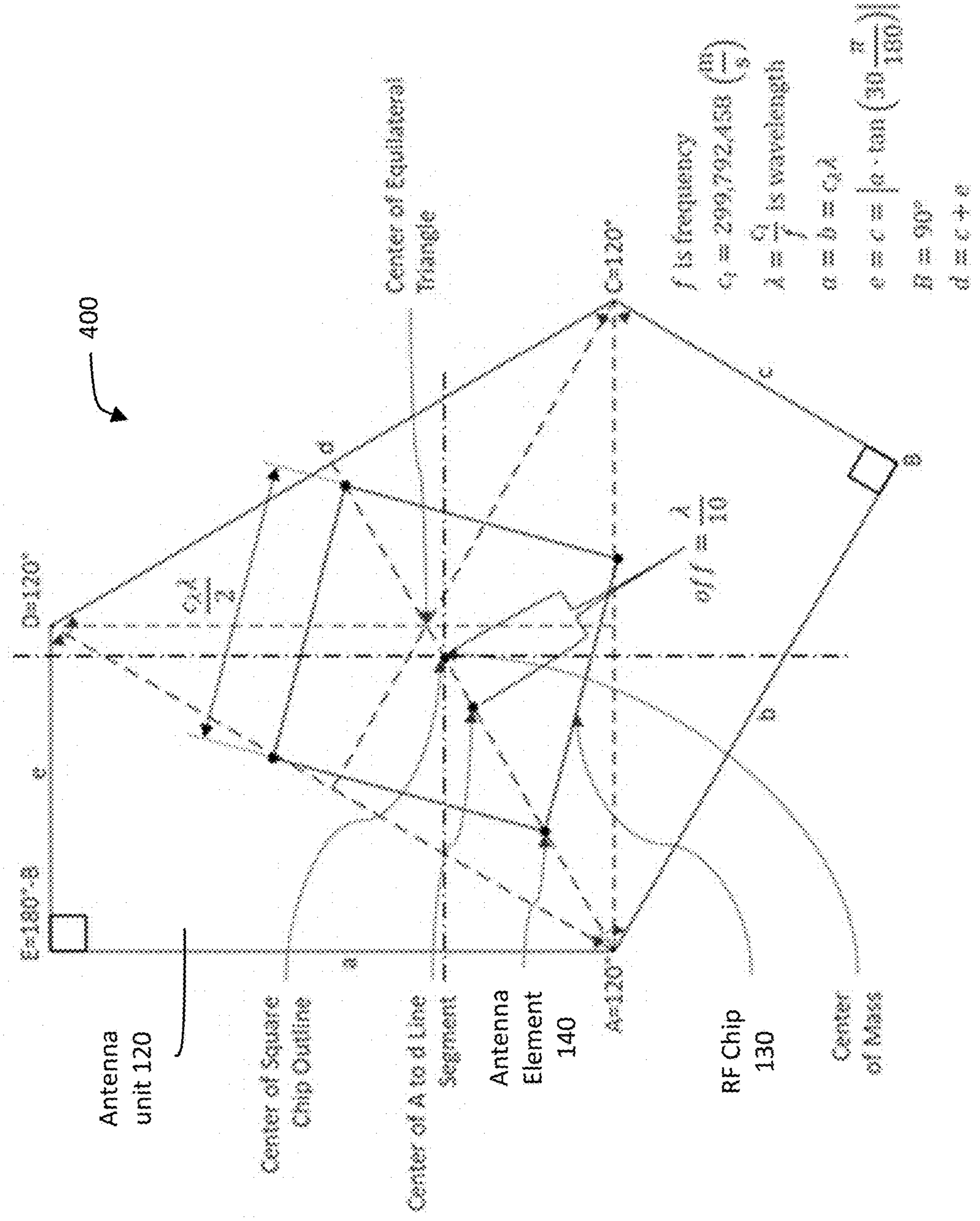

FIGS. 4A and 4B are geometric diagrams 400 and 450 applied to determine one or more geometric parameters of the antenna unit 102 and the antenna circuit chip 130, in accordance with some embodiments. The one or more geometric parameters include, but are not limited to, a length of the sides 215*a* and 215*b* of the antenna unit 102 and a length or width of the antenna circuit chip 130. In some embodiments, the antenna unit 120 is configured to operate in one of the X-Band, Ku-Band, K-Band, Ka-Band, and W-Band frequency ranges, and the one or more geometric parameters are determined accordingly. In an example, the antenna unit 120 has a pentagonal shape including two right angles (i.e., 90 degrees) and three blunt angles of 120 degrees.

The geometric parameters of the antenna unit 120 are determined based on a characteristic frequency of the antenna array 100. For example, the length of sides a and b (instances of side 215 FIGS. 2A-2C) is based on a wavelength (λ) of RF signals to be received and transmitted by the antenna elements of the antenna unit 120, and the wavelength of the RF signals is equal to the speed of light ($c_l$) divided by the characteristic frequency, a the wavelength is multiplied by a scaling factor ($c_\lambda$). The length of sides c and e are equal to the absolute value of the length of side a (or b) times the tangent of (π/6). Further, the length of side d is equal to a sum of the lengths c and e. As such, the antenna unit 120 having the above geometric parameters provides a footprint that can accommodate both the antenna circuit chip 130 and additional functional components (e.g., interconnects, connectors, and heat sinks).

In some embodiments, the antenna circuit chip 130 is a square chip. In some embodiments, each corner of the antenna circuit chip 130 includes an antenna element 140. The antenna circuit chip 130 is disposed in the antenna unit 120, such that a planar surface of the antenna circuit chip 130 is parallel with the front and back sides of the antenna unit 120. A center of the antenna tile 110, a first corner of the circuit chip 130, a second corner of the circuit chip 130 opposing the first angle of the circuit chip 130, and a center of a side d of the antenna unit 120 opposing the center of the antenna tile 110 are aligned. Each antenna elements 140 located at a respective corner of the circuit chip 130 is spaced a distance as close to the wavelength divided by 2 (i.e., λ/2) as possible. In other words, in some embodiments, the length of each side of the antenna circuit chip 130 is equal to the wavelength divided by 2. Such a separation distance substantially equal to (λ/2) suppresses and can minimize grating lobes. Additionally, in some embodiments, the center (centroid) of the RF chip 130 is positioned coincident with the center of a point defined by the intersection of a line segment from a corner to the midpoint of the opposite side and translated about the line segment by an offset distance. For example, the centroid of the RF chip 130 may be defined as the position coincident with the center of point A to the midpoint of side d. The offset distance may be defined as the wavelength divided by 10 (i.e., λ/10).

An additional usage area that can accommodate additional functional components (e.g., interconnects, connectors, and heat sinks) besides the antenna circuit chip 130 may be determined based at least in part on a total area of the antenna unit 120 (in this case, having a pentagon shape) minus an area of the antenna circuit chip 130. As depicted in FIG. 4C, conventional prior art solutions utilize square antenna units 460 such that the prior art usage area may be determined based at least in part on the area of the square antenna unit 460 minus the area of the antenna circuit chip 130. As shown in FIG. 4D, given the same antenna circuit chip 130 and the same separation distance of two antenna elements, the additional usage area 430 of the antenna unit 120 is greater than the prior art usage area 450 approximately by 20%. As such, the antenna unit 120 of a pentagonal shape fitting into a hexagon antenna tile 110 provides a larger footprint to accommodate additional functional components.

Figure 5:
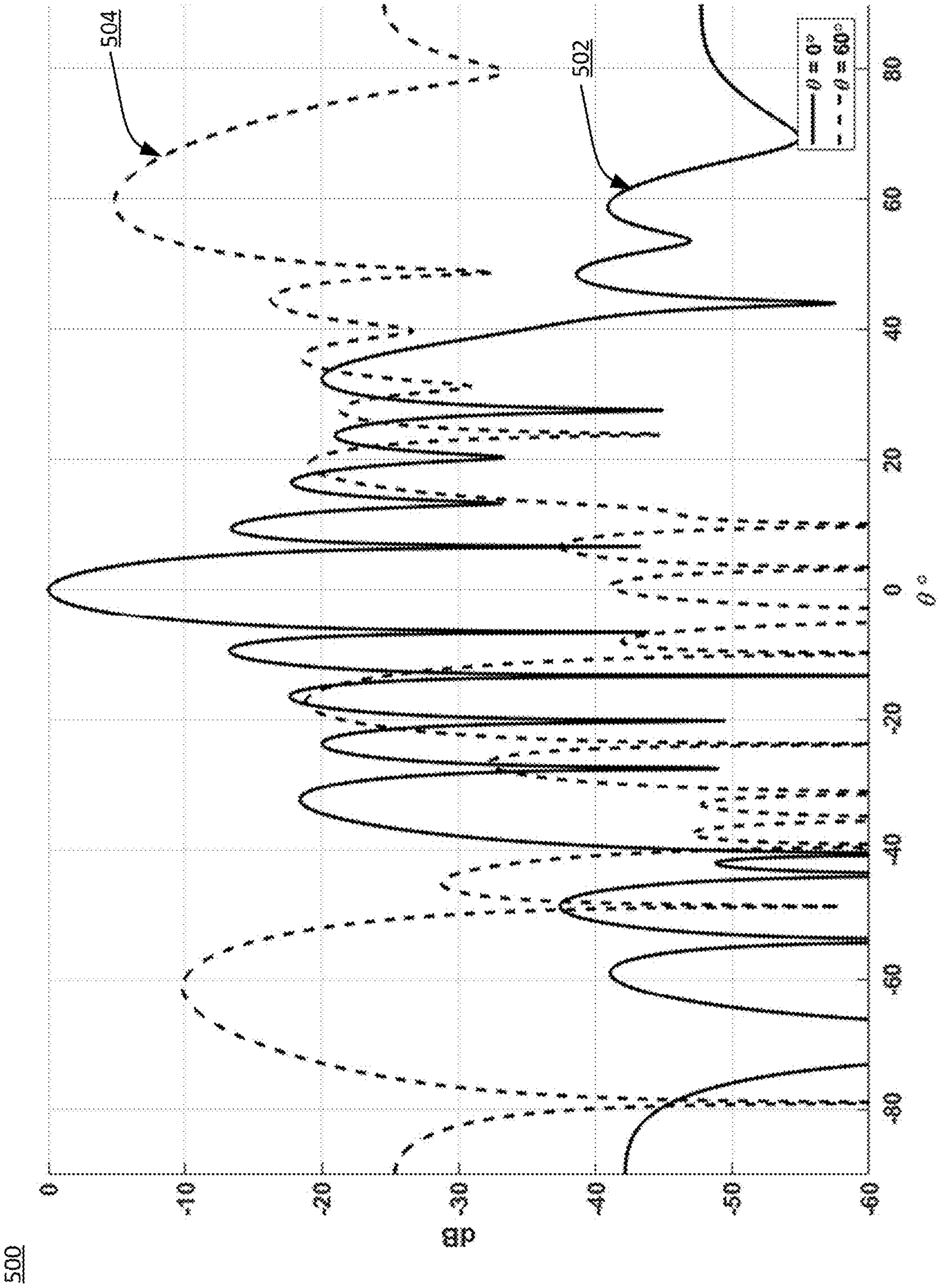
FIG. 5 is a graph illustrating array factor and half-power bean width (HPBW) performance of an antenna array at different beam steering angles, in accordance with some embodiments.

FIG. 5 is a graph 500 illustrating array factor and half-power bean width (HPBW) performance of an antenna array 100 at different steering angles, in accordance with some embodiments. The graph 500 shows performance of the antenna array 100 at a first position (e.g., theta (θ)=0°) represented by a solid line 502, and performance of the antenna array 100 at a second position (e.g., theta (θ)=60°) represented by a broken line 504. The antenna array 100 has a smaller HPWB and includes lower sidelobe value, e.g., than prior art square antenna unit 460. In some embodiments, the HPWB at boresight is less than 6°. In some embodiments, the HPWB at boresight is 5.8°. Further, as shown by the solid line 502, output signals of the antenna array 100 have a maximum value at θ=0°, and each measured value at a position other than θ=0° is less than the maximum value. Main lobe of the antenna array 100 is centered at θ=0°.

The antenna array 100 further provides grating lobes that are more directional than prior art antenna arrays (e.g., an antenna array made of the prior art square antenna unit 460). For example, the solid line in FIG. 5 is compared with the solid line in FIG. 6 (which, as discussed below, represents a prior art antenna array at the first position (e.g., theta (θ)=0°)). Total 8 grating lobes (e.g., lobes other than the center or maximum value lobe) are observed to be greater than −35 dB and located between θ=−40° and θ=40°, while total 10 grating lobes are observed to be greater than −35 dB and spread everywhere, i.e., between θ=−90° and θ=90°. As such the grating lobes are more directional in the antenna array 100 than the prior art antenna array.

Further, the antenna array 100 useable at greater scan angles than prior art antenna arrays. In particular, in some embodiments, the antenna array 100 useable up to an angle of +/−60° off an associated boresight. For example, the broken line in FIG. 5 is compared with the broken line in FIG. 6 (which, as discussed below, represents a prior art antenna array at the second position (e.g., theta (θ)=60°)). The main lobe for the antenna array 100 has a clear maximum value (e.g., at theta (θ)=60°) better than the prior art antenna array (which has a maximum value at theta (θ)=60° that slowly decays rather than a clearly defined maximum value).

Figure 6:
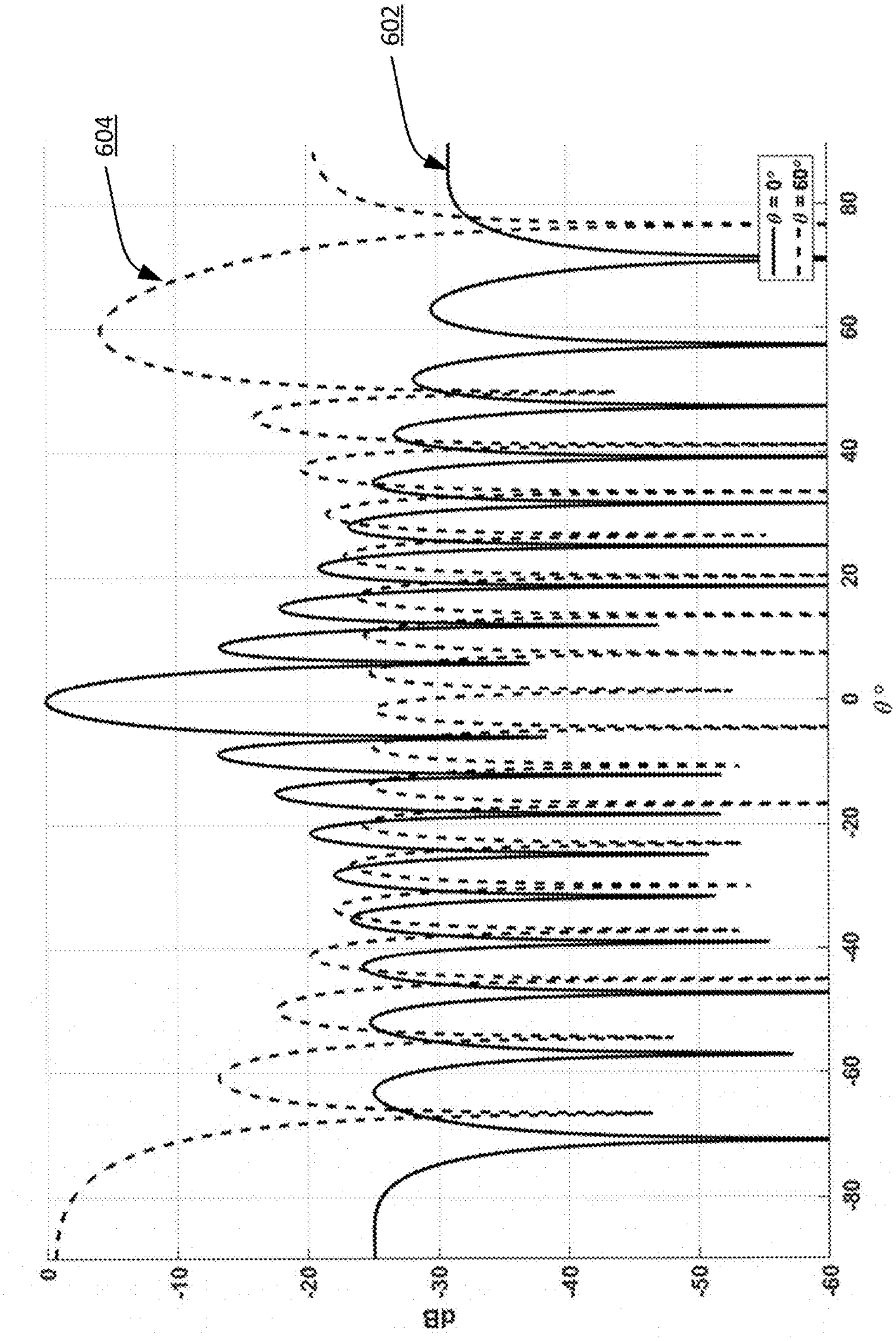
FIG. 6 is a graph illustrating array factor and HPBW performance of a prior art antenna array at different beam steering angles.

FIG. 6 is a graph 600 illustrating array factor and HPBW performance of a prior art antenna array at different beam steering angles. The graph 600 is provided for comparative purposes and shows performance of a prior art antenna array (e.g., a 324-element square array) at the first position (e.g., theta (θ)=0°) represented by a solid line 602, and performance of the prior art antenna array at the second position (e.g., theta (θ)=60°) represented by a broken line 604. As shown in relation to FIG. 5, the prior art antenna array has a larger HPWB and includes sidelobe values that remain consistently high. For example, as shown by the solid line, the prior art antenna array has a maximum value at the theta (θ)=0° (its first position) and each measured value at a position other than theta (θ)=0° is less than the maximum value but remains substantially the same (i.e., the sidelobe values do not decrease as shown in FIG. 5). Further, the prior art antenna array has grating lobes that are not as directional as the antenna array 100 (e.g., compare the different number of grating lobes between the solid lines in FIGS. 5 and 6) and is only usable up to a scan angle of up to +/−50° (e.g., at the second position the performance of the prior art antenna array is inconsistent or unusable due to the main lobe decaying over scan angle off associated boresight and/or time instead of being clearly defined).

Figure 7:
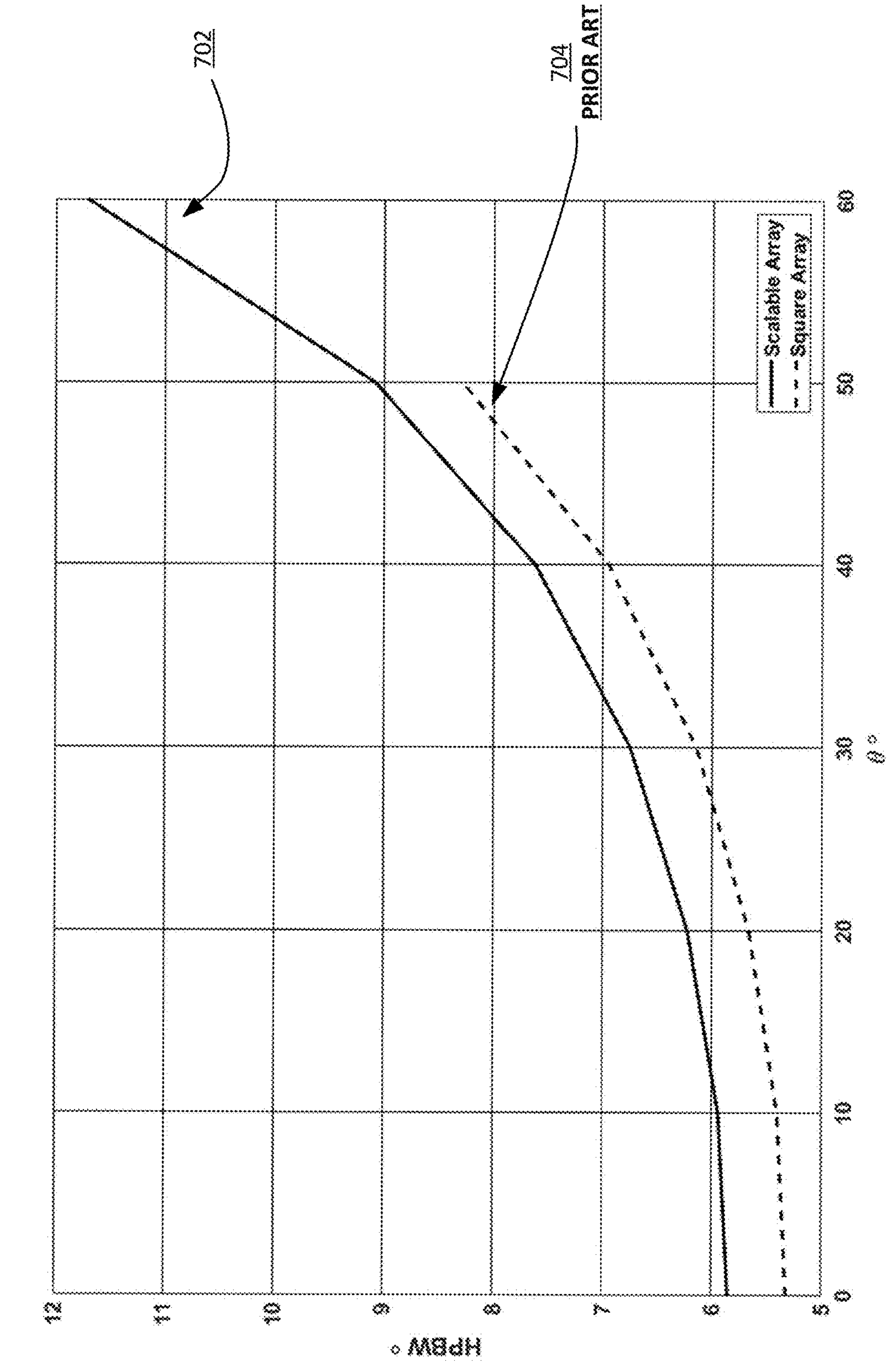
FIG. 7 is a graph comparing HPBW performance of an antenna array of this application and a prior art antenna array, in accordance with some embodiments.

FIG. 7 is a graph comparing the HPBW performance of the antenna array 100 and the prior art antenna array, in accordance with some embodiments. The graph 700 shows the HPBW performance of the antenna array 100 (represented by the solid line 702) and the HPBW performance of a prior art antenna array (represented by the broken line 704) at beam steering angles theta (θ) from 0° to 60°. As shown in graph 700, the antenna array 100 has an HPBW value less than 6° at θ=0°, the HPBW value increasing as the angle increases up to an HPBW value less than 12° at θ=60°. Alternatively, the prior art antenna array has an HPBW value over 5° at θ=0°, the HPBW value increasing as the angle increases up to an HPBW value of approximately 8° at θ=50° (the HPBW value of the prior art antenna array was not measurable at 60°).

Figure 19:
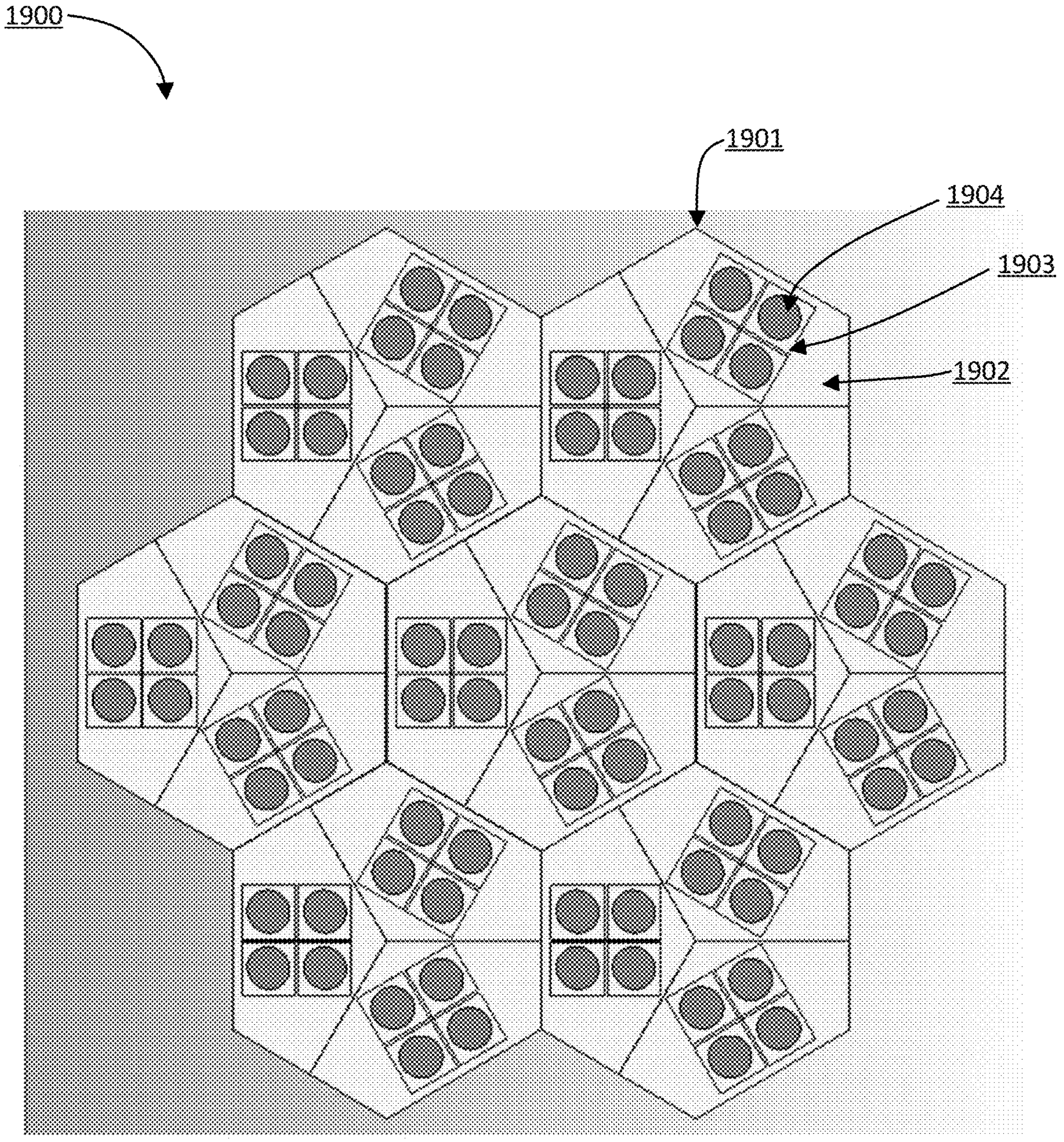
FIG. 19 illustrates an example antenna array configuration in accordance with some embodiments.

FIG. 19 depicts an example configuration of an antenna array 1900 in accordance with some example embodiments. The particular antenna array 1900 includes seven antenna tiles 1901. Each antenna tile 1901 includes three antenna units 1902, which are tessellated with one another to form the hexagonal shape of the antenna tile 1901. In the antenna array 1900, each antenna unit 1902 is identical to the other antenna units and each antenna unit has a pentagonal shape. Furthermore, each antenna unit 1902 includes an antenna circuit chip 1903, which includes four antenna elements 1904.

Figure 20A:
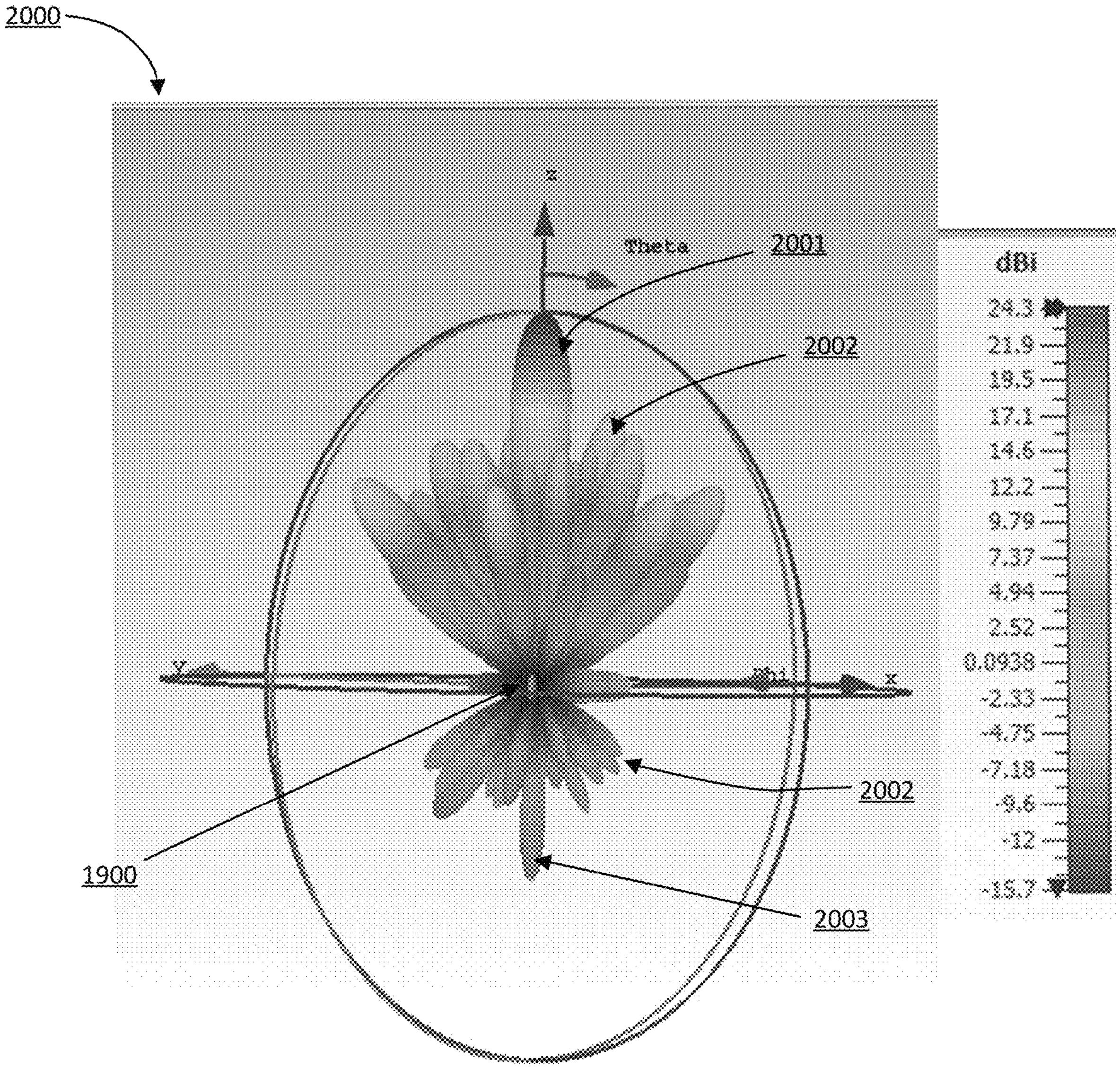
FIGS. 20A-B are diagrams illustrating three-dimensional radiation patterns of an antenna array, such as the antenna array depicted in FIG. 19, in accordance with some embodiments.
Figure 20B:
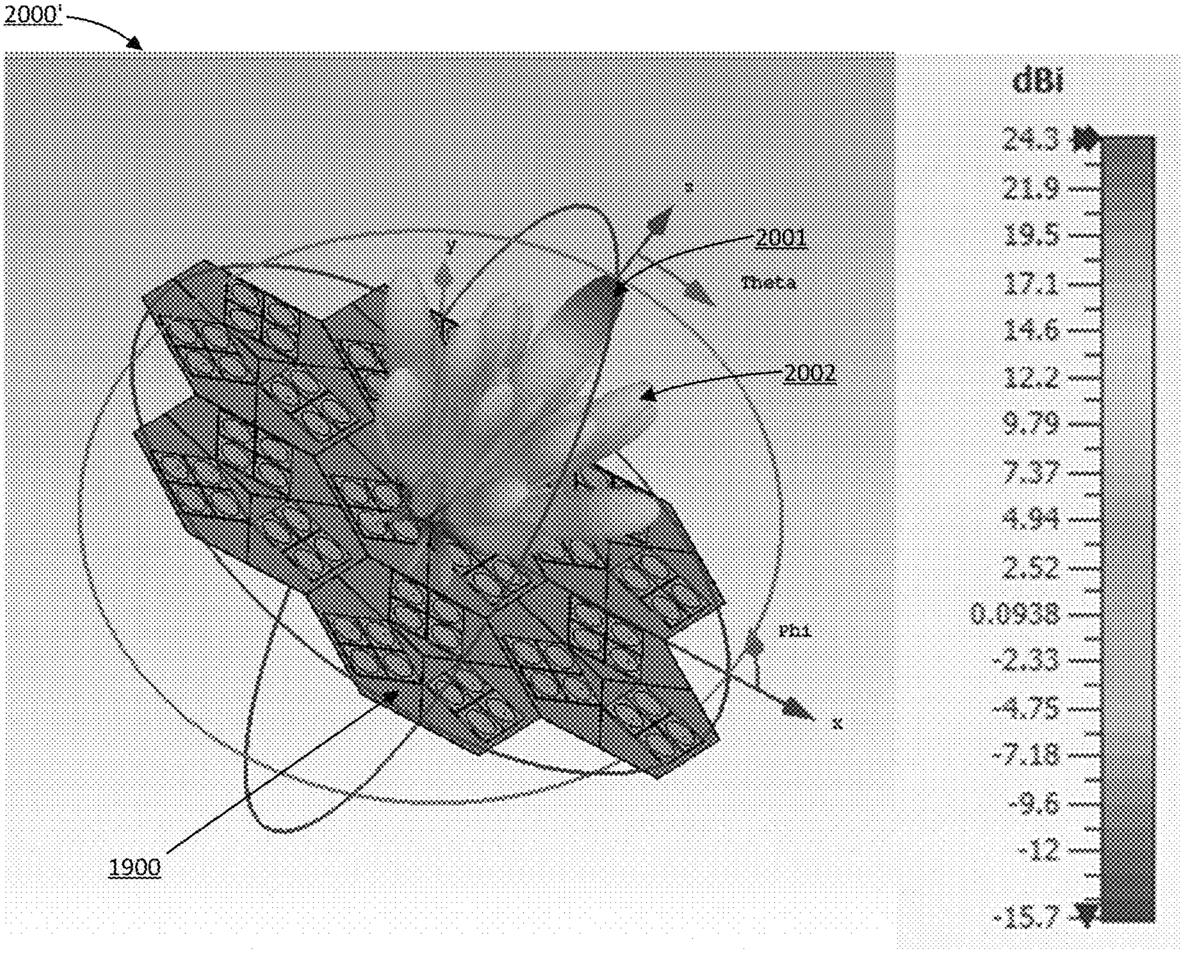

FIGS. 20A and 20B depict a three-dimensional radiation (or beam) pattern of an antenna array, such as the antenna array 1900 depicted in FIG. 19. FIG. 20A depicts a side view of the three-dimensional radiation pattern 2000 when one or more antenna units of antenna array are operating at a frequency of 37 GHz (i.e., the Ka-Band). A main lobe 2001 can be seen extending perpendicularly from the top face of the antenna array 1900 with one or more side lobes 2002 extending at an angle from the top face of the antenna array 1900. A back lobe 2003 and one or more side lobes 2002 may also be seen extending from the bottom face of the antenna array 1900.

FIG. 20B depicts an angled view of the three-dimensional radiation pattern 2000' when operating at a frequency of 37 GHz (i.e., the Ka-Band). The main lobe 2001 can again be seen extending perpendicularly from the top face of the antenna array 1900 with one or more side lobes 2002 extending at an angle from the top face of the antenna array 1900. Additionally, the main lobe and one or more side lobes can be seen as centralized at the center of the innermost antenna tile. The main lobe 2001 of antenna array 1900 is capable of achieving a directive gain of approximately 24 decibels relative to isotropic (dBi).

Figure 21:
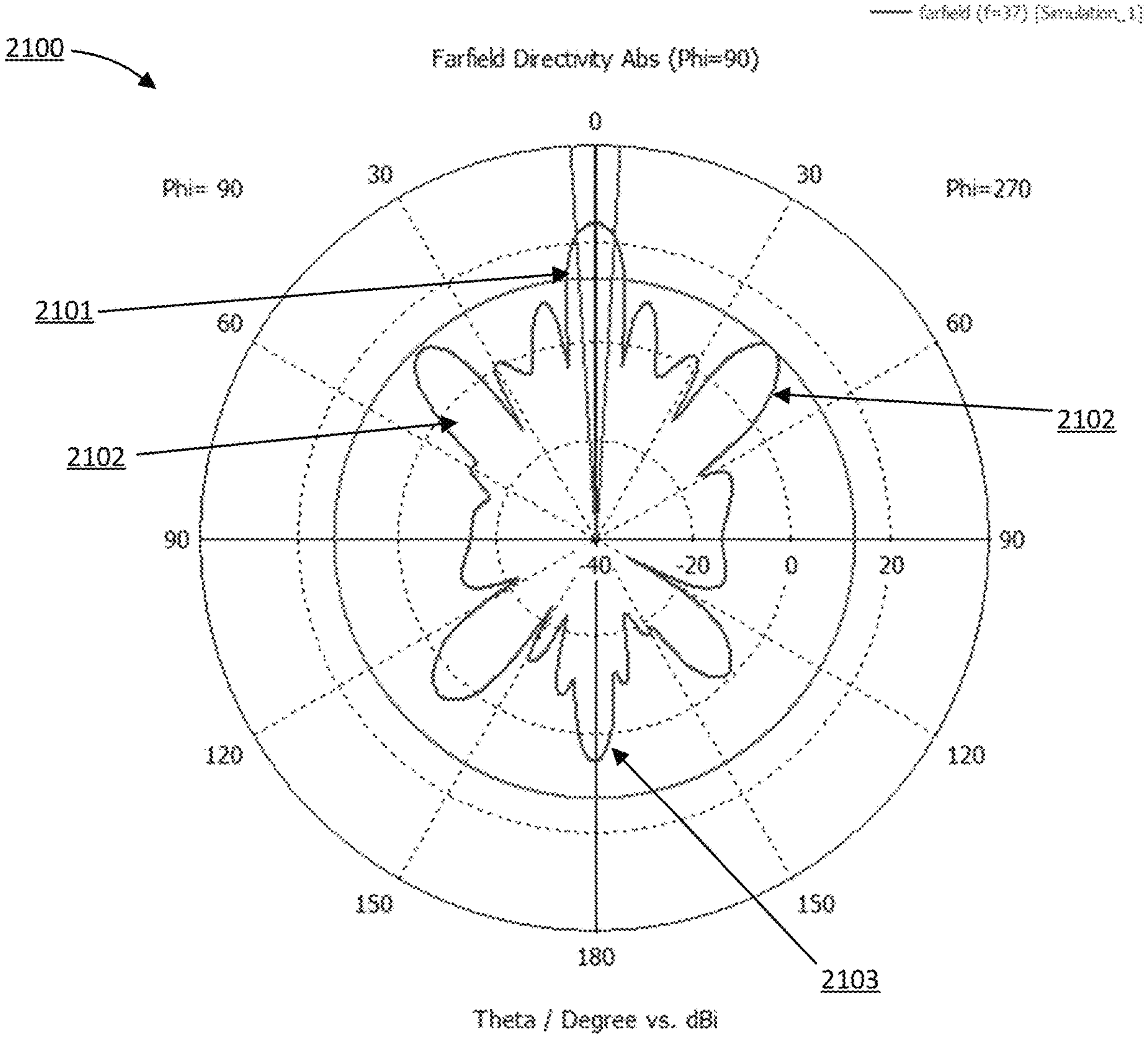
FIG. 21 is a two-dimensional radiation pattern of an antenna array, such as the antenna array depicted in FIG. 19, in accordance with some embodiments.

FIG. 21 depicts a two-dimensional radiation pattern for an antenna array, such as antenna array 1900 as depicted in FIG. 19. As shown in FIG. 21, a main lobe 2101 corresponding to a directive gain of approximately 24 dBi can be seen at 0°. The main lobe 2101 can also be seen to span approximately 7° in width. Additionally, one or more side lobes 2102 and back lobe 2103 are shown in the radiation pattern. In particular, one or more sidelobes 2102 occur at approximately 45°, 135°, −45°, and −135°. Additional sidelobes may be interspersed between the aforementioned angles and/or the main lobe 2101 and back lobe 2103. Furthermore, the one or more side lobes 2102 correspond to a side lobe level of approximately −11 decibels relative to isotropic (dBi).

Figure 8:
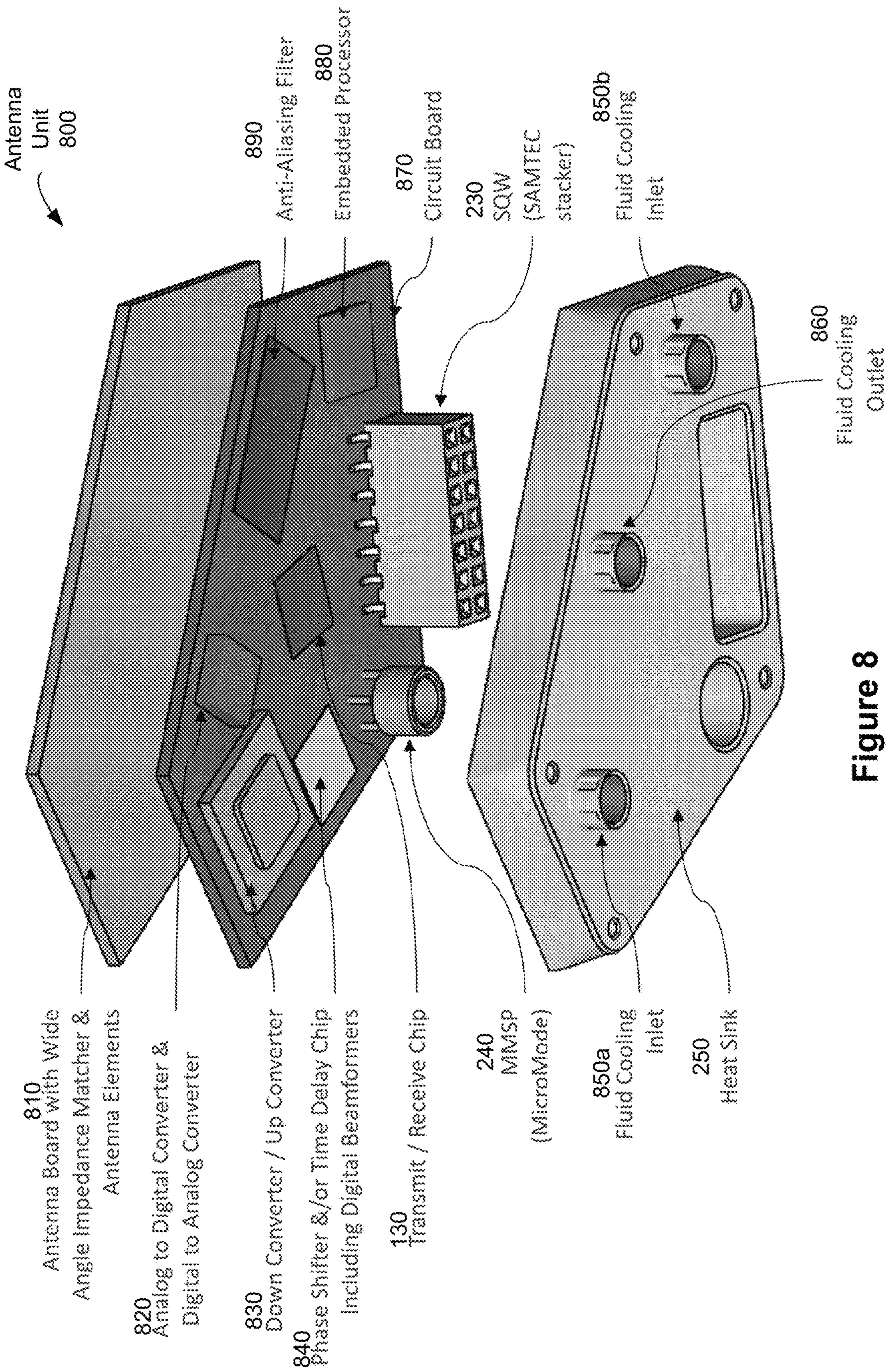
FIG. 8 is a bottom side exploded perspective view of an antenna unit, in accordance with some embodiments.

FIG. 8 is a bottom side exploded perspective view of an antenna unit 800, in accordance with some embodiments. The antenna unit 800 includes one or more of: an antenna board 810, an ADC and a DAC 820, a down converter and up converter 830, an antenna circuit chip 130, phase shifter and/or time delay chip including digital beamformers 840, one or more ports (e.g., SAMTEC stacker 230 and MMSP 240), a heat sink 250, one or more fluid cooling inlets 850 and outlet 860, a circuit board 870, an embedded processor 880, and an anti-aliasing filter 890. The antenna unit 800 can be an instance of the antenna unit 120 described above. For example, the antenna unit 800 can be tessellated with one or more other antenna units 800 to form an antenna tile 110 and an antenna array 100.

In some embodiments, the antenna board 810 includes a wide angle impedance matcher and/or one or more antenna elements. The antenna board 810 operates as an outer surface in which the circuit board 870 is housed (the heat sink 250 being the bottom portion of the housing). The circuit board 870 electrically couples one or more components of the antenna unit 800, such as the ADC/DACs 820, the down converter/up converter 830, the antenna circuit chip 130, the phase shifter and/or time delay chip including digital beamformers 840, the embedded processor 880, and the anti-aliasing filter 890.

The ADC and DACs 820, the down converter/up converter 830, and the antialiasing filter 890 are used to process the one or more radio frequency signals received by, or to be transmitted by, the antenna unit 800. In some embodiments, the embedded processor 880 executes software modules for controlling the antenna unit 800. In some embodiments, the embedded processor 880 provides instructions to one or more of the antenna circuit chip 130 and the phase shifter and/or time delay chip including digital beamformers 840. In some embodiments, the embedded processor 880 receives and processes data received via the one or more ports (e.g., SAMTEC stacker 230 and MMSP 240).

The heat sink 250 is configured to absorb and dissipate heat from one or more components of the antenna unit 800. For example, the heat sink 250 can transfer heat from antenna circuit chip 130, the embedded processor 880, the phase shifter and/or time delay chip including digital beamformers 840, and/or other electrical components. In some embodiments, the heat absorbed by the heat sink 250 is dissipated by air convection. In some embodiments, the heat sink 250 is liquid cooled via a cooling fluid (such as water, refrigerants, water/ethylene glycol mixtures, or other coolants known in the art). In some embodiments, the cooling fluid enters via one or more fluid cooling inlets 850*a*/850*b* and exits via a fluid cooling outlet 860. In some embodiments, the heat sink 250 is comprised of aluminum, copper, and/or other materials with sufficient thermal conductivity.

Figure 9:
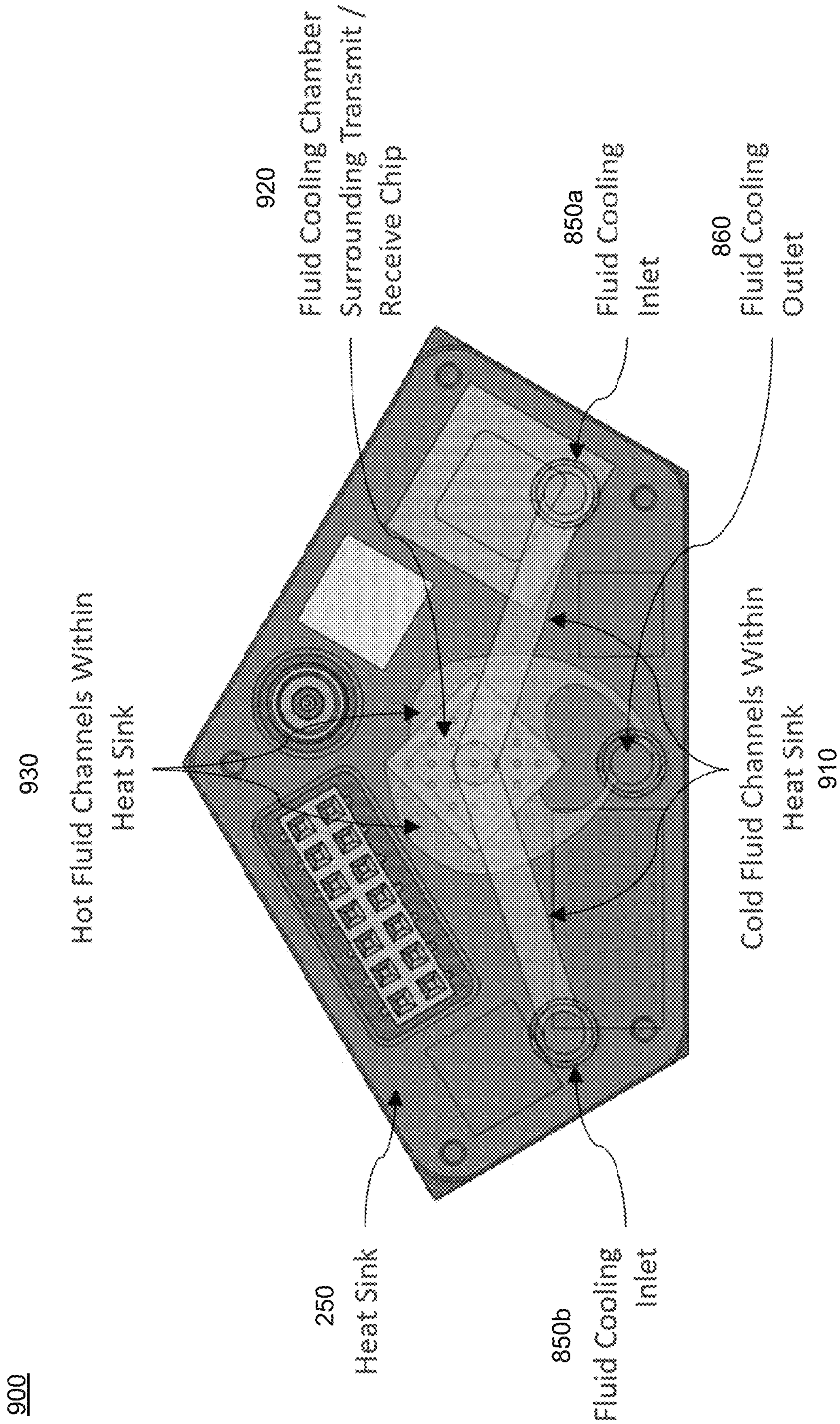
FIG. 9 is a partially transparent bottom view of an antenna unit, in accordance with some embodiments.

FIG. 9 is a partially transparent bottom view of an antenna unit, in accordance with some embodiments. A bottom view 900 shows the heat sink 250, fluid cooling inlets 850*a* and 850*b*, fluid cooling outlet 860, cold fluid channels 910 integrated in the heat sink 250, the fluid cooling chamber 920 disposed in proximity to the antenna circuit chip 130 (FIG. 1), and a hot fluid channels 930 in the heat sink 250. The fluid cooling inlets 850*a* and 850*b* are fluidically coupled to the cold fluid channels 910 within the heat sink 250 and the cold fluid channels 910 are fluidically coupled to the fluid cooling chamber 920. The fluid cooling chamber 920 may also be fluidically coupled to the hot fluid channels 930 and the fluid cooling outlet 860. In some embodiments, the cold fluid channels 910 and/or hot fluid channels 930 may have diameters of approximately 1000 micrometers or less.

Cooling fluid enters from either or both of the fluid cooling inlets 850*a* and 850*b* and moves towards the fluid cooling chamber 920, such as via the cold fluid channels 910. In the fluid cooling chamber 920, heat generated from at least the antenna circuit chip 130 is transferred to the cooling fluid. As a result, the heat from the antenna circuit chip 130 is dissipated resulting in a cooler temperature for the antenna circuit chip, and the temperature of the cooling fluid is increased based on the amount of heat dissipated from the antenna circuit chip 130. The heated cooling fluid further moves from the fluid cooling chamber 920 to the hot fluid channels 930 within the heat sink 250 and exits via the fluid cooling outlet 860. In some embodiments, the fluid cooling inlets 850*a* and 850*b* and fluid cooling outlet 860 are coupled to one or more pumps (not shown) that promote flow of the cooling fluid via the antenna unit 800. In some embodiments, the fluid cooling inlets 850*a* and 850*b* and fluid cooling outlet 860 are coupled to a fluid network (e.g., an open or closed liquid loop) that keeps the cooling fluid moving to and through one or more fluidically coupled antenna units 800. In some embodiments, the pumps and/or the fluid network are part of an antenna array 100. In some embodiments, the antenna unit 800 can be quickly coupled to and decoupled from the fluid network and/or pumps via fluid switching couplers.

Figure 10:
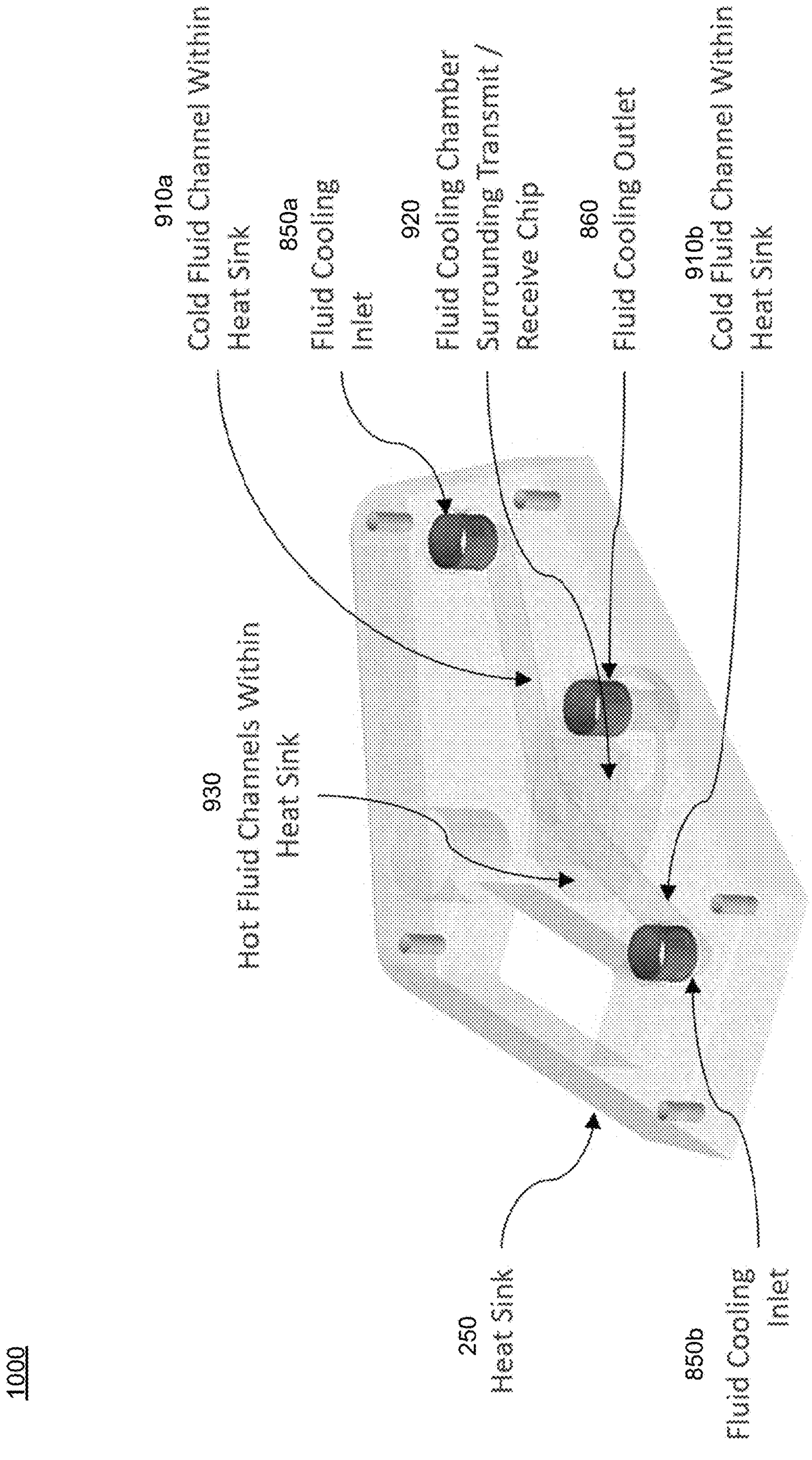
FIG. 10 is a partially transparent bottom perspective view of a thermal management system of an antenna unit, in accordance with some embodiments.

FIG. 10 is a partially transparent bottom perspective view of a thermal management system 1000 of an antenna unit 120, in accordance with some embodiments. The thermal management system 1000 includes the heat sink 250, fluid cooling inlets 850*a* and 850*b*, fluid cooling outlet 860, cold fluid channels 910, the fluid cooling chamber 920 disposed in proximity to the antenna circuit chip 130 or any other heat-generating components, and hot fluid channels 930 within the heat sink 250. Although the examples in FIGS. 9 and 10 show the antenna circuit chip 130 being cooled, other heat-generating components (e.g., the embedded processor 880) as described in FIG. 8 can be cooled by the cooling fluid as well.

Figure 11B:
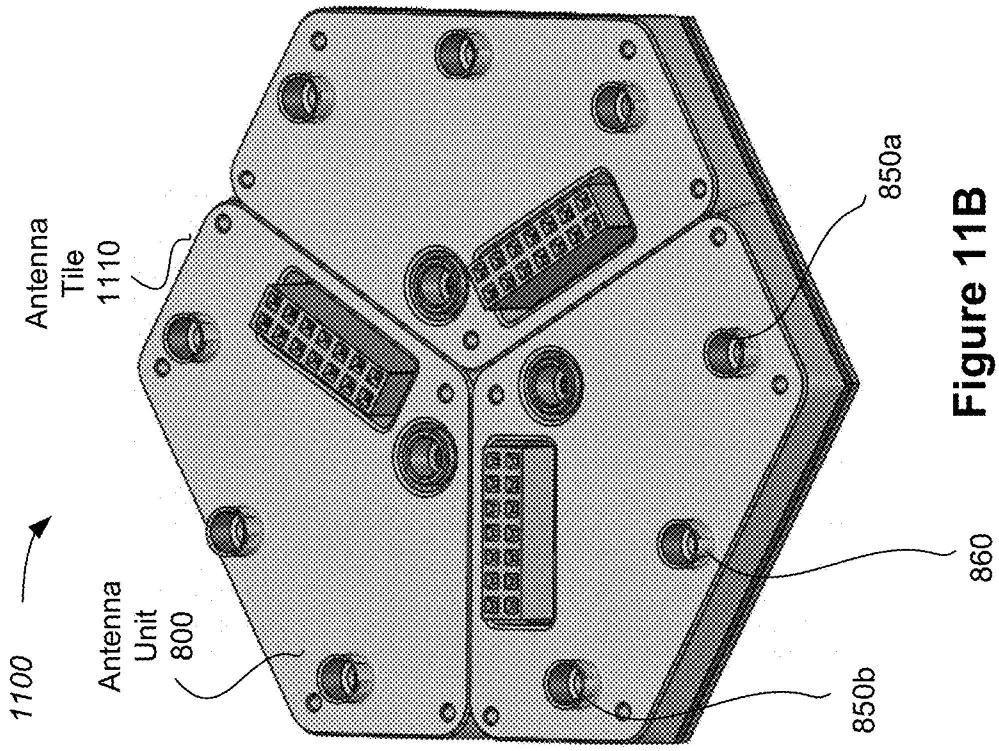
FIGS. 11A and 11B are front side and back side perspective views of an antenna tile, in accordance with some embodiments, respectively.
Figure 11A:
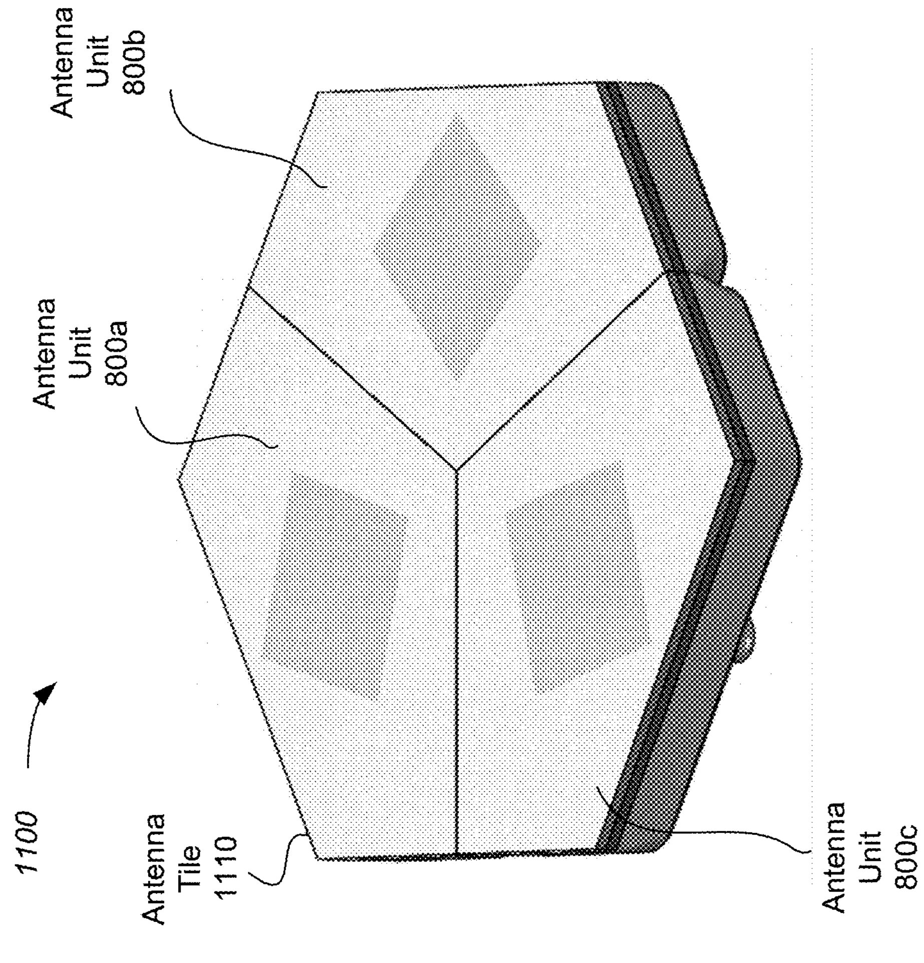

FIGS. 11A and 11B are front side and back side perspective views of an antenna tile 1100, in accordance with some embodiments, respectively. The antenna tile 110 are tessellated with three antenna units 120 each having a respective thermal management system 1000. The antenna tile 1110 can be an instance of the antenna tile 110 described above with reference to FIGS. 1-3B. Referring to FIG. 11B, the one or one or more ports of each antenna unit 800 is exposed and left unobstructed. Additionally, the fluid cooling inlets 850*a* and 850*b* and fluid cooling outlet 860 of each antenna unit 800 are also left unobstructed. Each antenna unit 800 can be individually or jointly liquid cooled (via their respective fluid cooling inlets 850*a* and 850*b* and fluid cooling outlet 860).

Each antenna unit 800 can be individually controlled (via the one or more ports). In some embodiments, the one or more antenna units 800 of an antenna tile 1110 are configured to operate in conjunction with one another (producing a desired result at the antenna tile 1110 as a whole). In some embodiments, an antenna tile 1110 is individually controlled (via its respective one or more antenna units 800), independently from any other antenna tiles 1110. In some embodiments, an antenna tile 1110 is jointly controlled (via its respective one or more antenna units 800) with one or more other antenna tiles 1110. In an example, the antenna array 100 includes a phased antenna array, and the antenna tiles 1110 in the phased antenna array are controlled jointly with correlated phases to create a steerable beam of radio waves pointing in different directions without moving the antenna array 100.

Figure 12A:
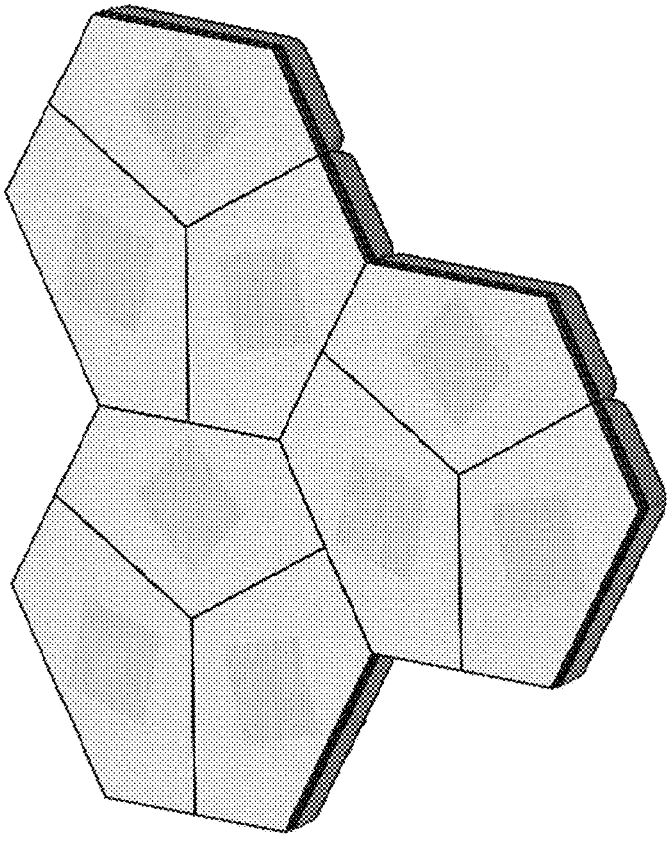
FIGS. 12A and 12B are front side and back side perspective views of an antenna array 1200, in accordance with some embodiments, respectively.
Figure 12B:
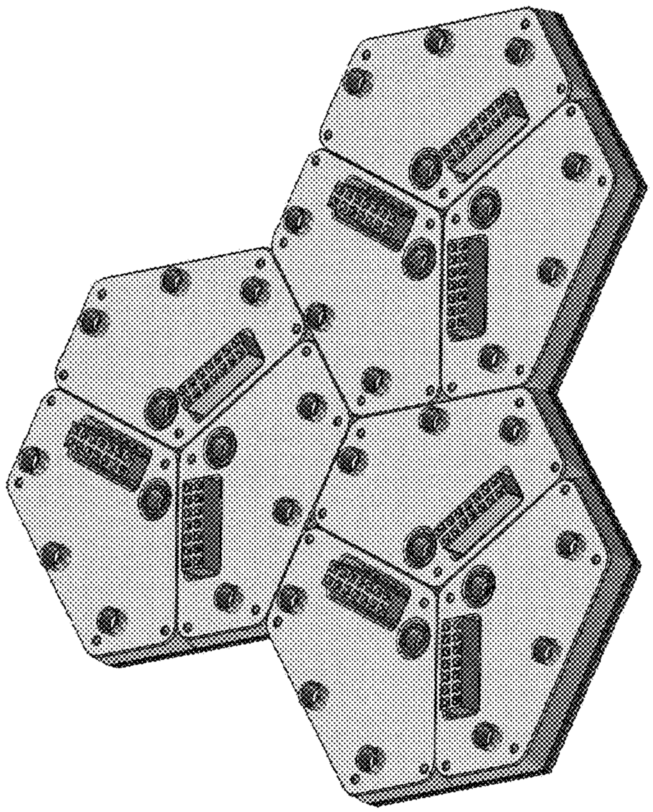

FIGS. 12A and 12B are front side and back side perspective views of an antenna array 1200, in accordance with some embodiments, respectively. The antenna array 1200 is tessellated with the antenna tiles 1100 each including a plurality of antenna units 120. The antenna unit 120 is the minimum structure that is repeated in the antenna array, and optionally has a thermal management system 1000. The tessellated antenna tiles 1110 of the antenna array 1200 are similar to the tessellated antenna tiles 110 shown in FIGS. 3A and 3B. For example, the tessellated antenna tiles 1110 form the antenna array 100 (FIG. 1) and perform one or more of the features described above with reference to FIGS. 1-7.

Figure 13:
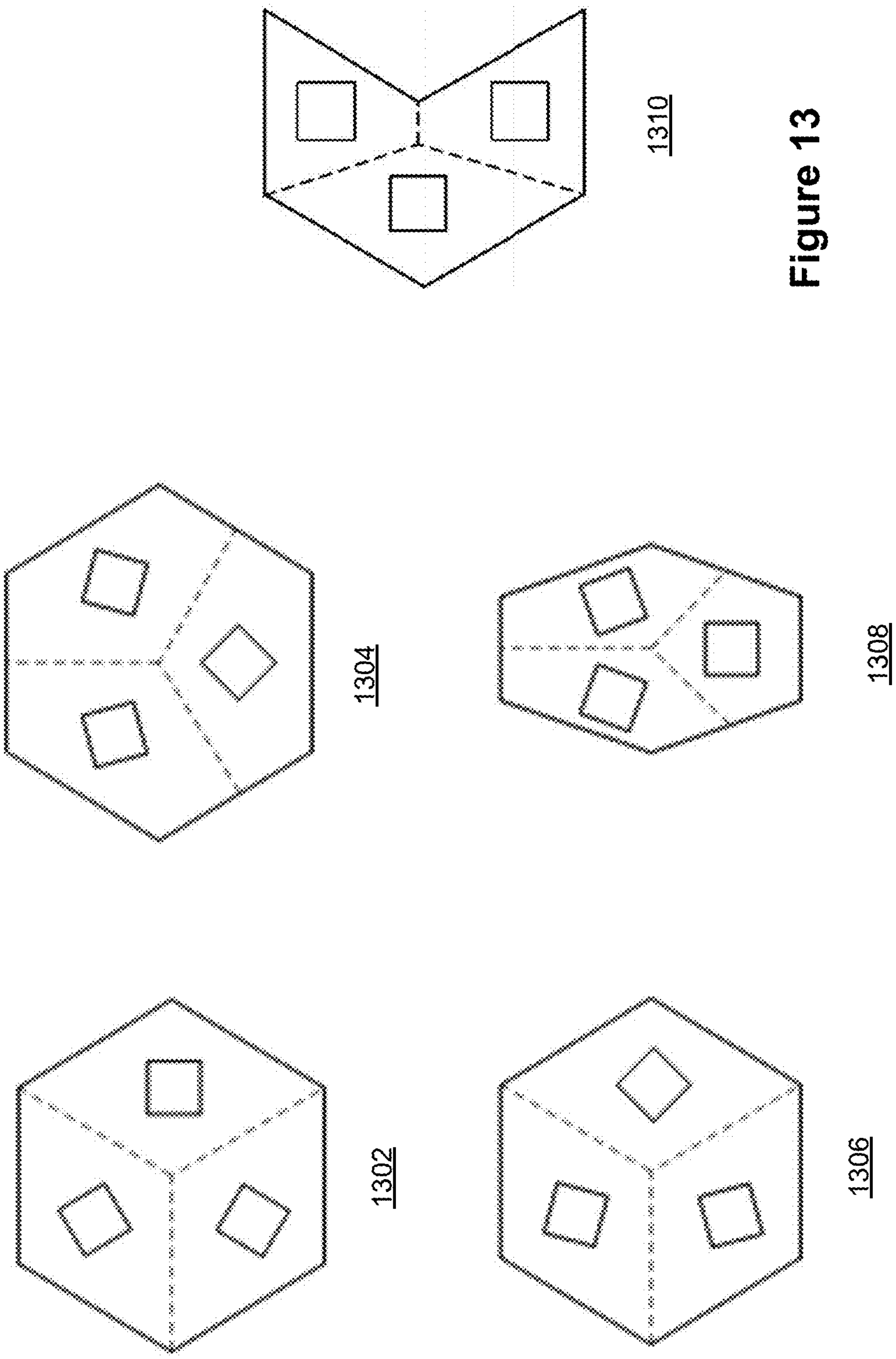
FIG. 13 illustrates alternative configurations of antenna units of an antenna tile, in accordance with some embodiments.

FIG. 13 illustrates alternative configurations 1302-1310 of the antenna units 120 of an antenna tile 110, in accordance with some embodiments. The antenna tile 110 has a concave hexagon shape or a convex hexagon shape. The antenna units (e.g. antenna units 120 and 800) can be different shapes and sizes. Each antenna unit can be substantially identical, identical, or different. The antenna units 120 are configured to be tessellated with one another to form an antenna tile 110. FIG. 13 provides examples of different shaped antenna units such as pentagons, trapezoids, kites, diamonds, rhombuses. Each of the antenna units shown in FIG. 13 are configured to perform the features described above in FIGS. 1-12.

In some embodiments, the antenna units 120 includes three identical rhombuses that closely fit into and fill an antenna tile 1302 or 1306 having a convex and equilateral hexagon shape. Each rhombus in the antenna tiles 1302 and 1304 includes a first angle overlapping a center of the antenna tile 110 and a second angle opposite the first angle. In the rhombus in the antenna tile 1302, the antenna circuit chip 130 has two opposite sides facing the first and second angles of the rhombus, respectively. In the rhombus in the antenna tile 1306, the antenna circuit chip 130 has two opposite corners pointing to the first and second angles of the rhombus, respectively. Alternatively, in some embodiments, the antenna units 120 include three identical pentagons that closely fit into and fill an antenna tile 1304 having a convex and equilateral hexagon shape. Alternatively, in some embodiments, the antenna units 120 in the same tile 110 can be different. For instance, the antenna tile 1310 has a concave and equilateral hexagon shape. A first antenna unit 120 has a kite shape and two other antenna units are trapezoids that closely fit into and fill the antenna tile 1310 with the kite shape. The kite shaped antenna unit 120 and the two trapezoid shaped antenna units 120 optionally have equal areas. In another example, the antenna units 120 includes three pentagons that closely fit into and fill an antenna tile 1308 and have at least two different pentagonal shapes. The antenna tile 1308 has a convex and equilateral hexagon shape and is stretched in a direction, so the antenna tile 1308 is not regular.

Figure 14:
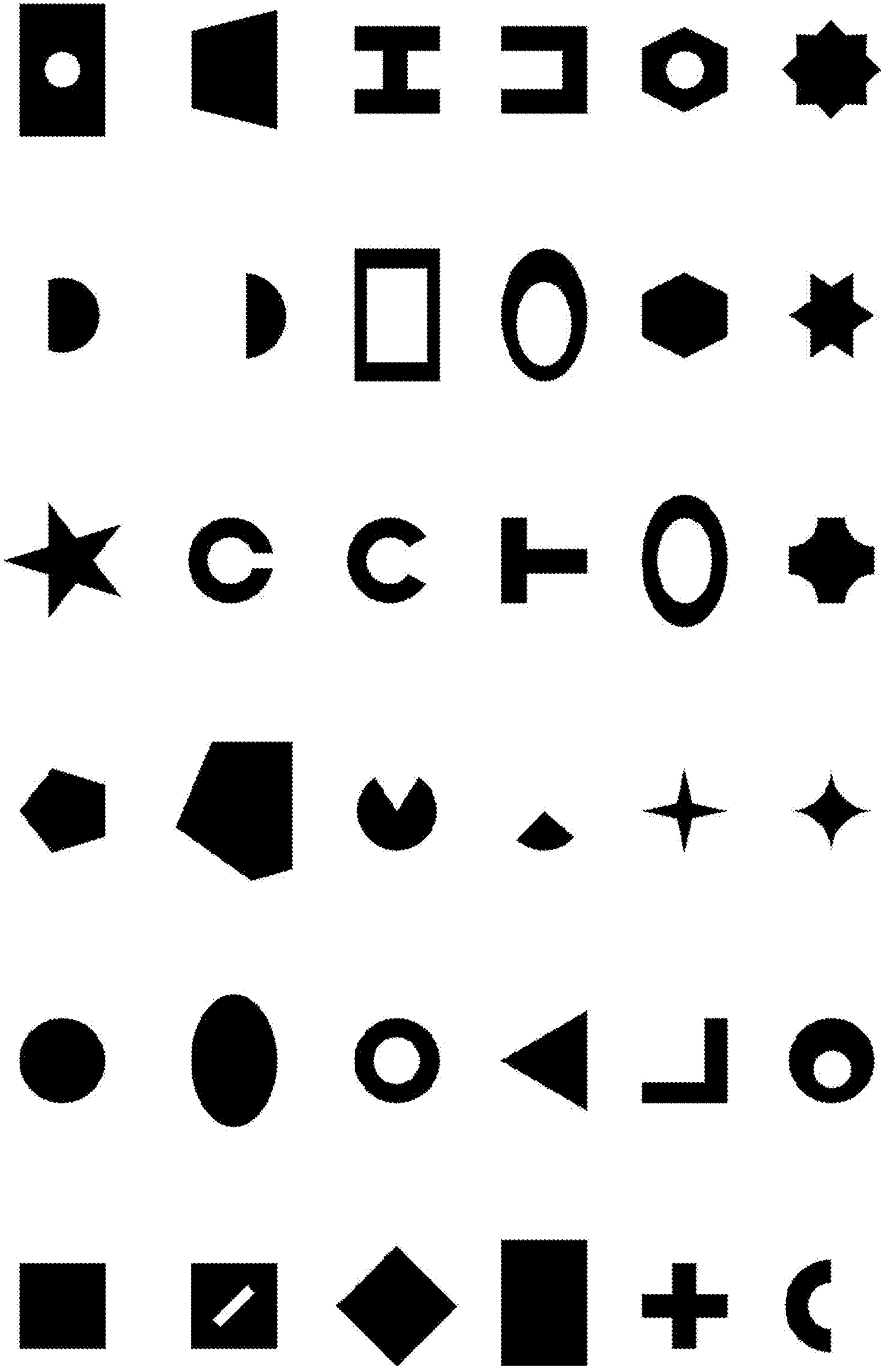
FIG. 14 illustrates configurations of antenna circuit chips or antenna elements of each antenna unit, in accordance with some embodiments.

FIG. 14 illustrates configurations of antenna circuit chips 130 or antenna elements of each antenna unit, in accordance with some embodiments. FIGS. 1-13 refer to a square antenna circuit chip 130, while any different type of antenna circuit chip 130 can be used to generate the desired results. In some embodiments, geometric parameters of the antenna circuit chip 130 need be determined based on a desired operational frequency or frequency band of the antenna unit 120. In some embodiments, a shape of the antenna circuit chip 130 is limited to a square or rectangular shape, and however, locations to couple the antenna elements are adjusted based on the desired operational frequency or frequency band of the antenna unit 120. A shape of each antenna element is selected from the shapes shown in FIG. 14, and an orientation and geometric sizes are determined based on electrical performance of the antenna unit 120.

Figure 15:
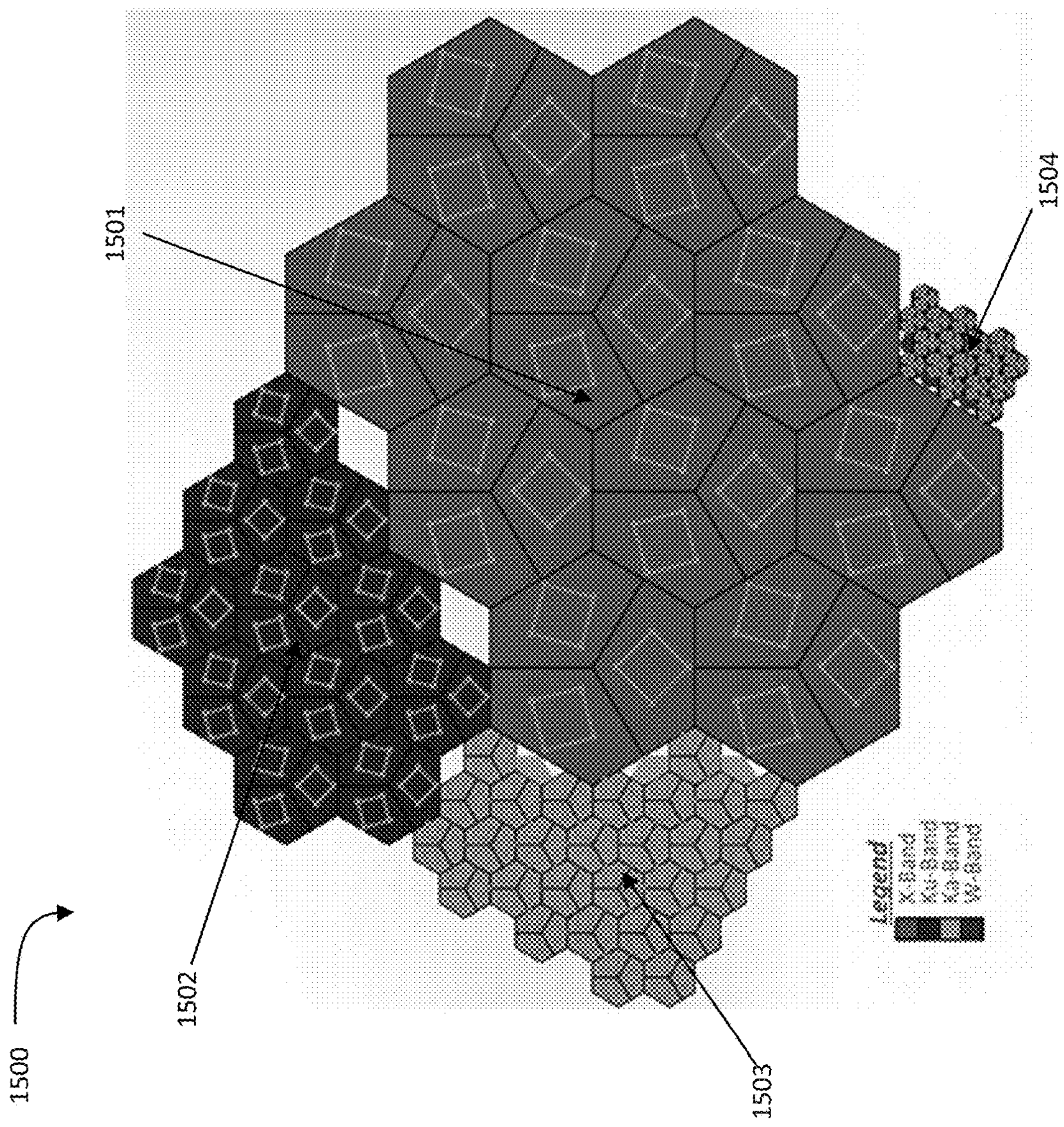
FIG. 15 illustrates an example configuration of an antenna array configured for multi-frequency band operations, in accordance with some embodiments.

FIG. 15 illustrates an example configuration of an antenna array 1500 configured for multi-frequency band operations. As discussed with respect to FIGS. 2A-C and FIGS. 3A-B, the configuration of antenna units (e.g., the length of the side of the antenna circuit chip, side length, etc.) may determine the operational frequency range for the antenna unit. As such, an antenna tile which includes one or more antenna units, also is configured to operate at a particular frequency range, such as at one of X-Band, Ku-Band, K-Band, Ka-Band, V-Band, or W-Band. In some instances, it may be desirable for an antenna array to include antenna tiles configured to operate at different frequency ranges. In some embodiments, each antenna unit is attached to a common antenna board and/or heat sink.

The antenna array 1500 illustrates an example antenna array configuration for multi-frequency band operations. The antenna array 1500 includes two or more antenna tiles, each configured to operate at a particular frequency range. In particular, the antenna array includes one or more antenna tiles 1501 configured to operate at X-Band frequencies, one or more antenna tiles 1502 configured to operate at K-Band frequency range, one or more antenna tiles 1503 configured to operate at Ka-Band frequency range, and/or one or more antenna tiles 1504 configured to operate at W-Band frequency range. In the particular antenna array configuration 1500, each of the one or more antenna tiles corresponding to an operating frequency range are grouped together in a particular operating frequency range section. For example, all of the antenna tiles 1501 configured to operate at X-Band frequencies are grouped in an X-Band frequency range section such while all antenna tiles 1502 configured to operate at K-Band frequencies are grouped in a K-Band frequency range section.

In some embodiments, the antenna array 1500 may include gaps between antenna tiles configured to operate at different frequencies. These gaps may be sized such that a single antenna unit may be inserted into the gap such that the gap is closed. However, it should be appreciated that as the one or more antenna tiles and/or antenna units are configured to operate independently, such gaps will not interfere with the performance of the antenna array.

Figure 16:
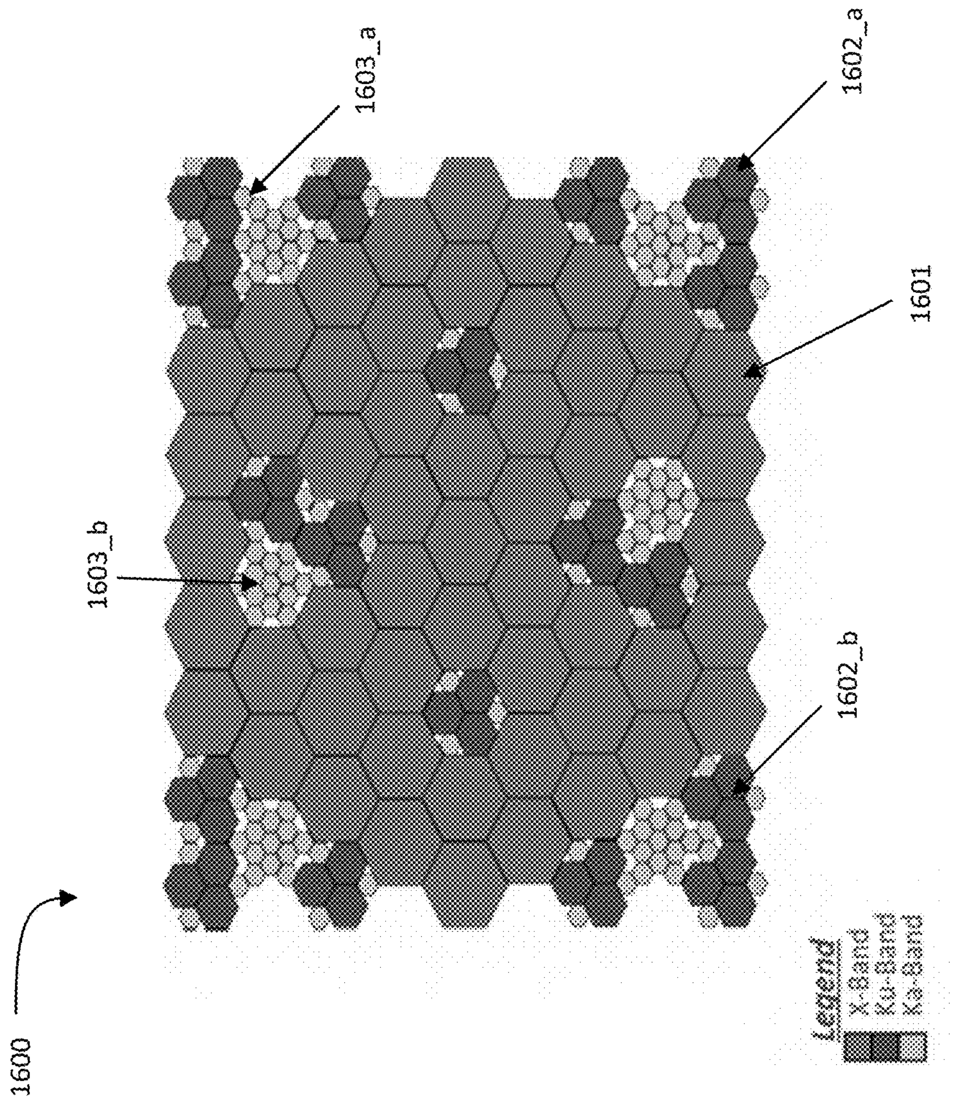
FIG. 16 illustrates an example alternate configuration of an antenna array configured for multi-frequency band operations, in accordance with some embodiments.

FIG. 16 illustrates an example alternative configuration of an antenna array 1600 configured for multi-frequency band operations. Similar to the antenna array 1500, the antenna array 1600 includes one or more antenna tiles 1601 configured to operate at X-Band frequencies, one or more antenna tiles 1602_*a* and 1602_*b* configured to operate at Ku-Band frequencies, one or more antenna tiles 1603_*a* and 1602_*b* configured to operate at Ka-Band frequencies, and/or one or more antenna tiles configured to operate at W-Band frequencies (not shown). The antenna array configuration 1600 illustrates a configuration where the one or more antenna tiles corresponding to an operating frequency range are interspersed with one another. For example, the antenna tiles 1602_*a* and 1602_*b* configured to operate at Ku-Band frequencies are separated from one another. Further, the antenna tiles 1602_*a* and 1602_*b* are interspersed between antenna tiles 1601 configured to operate at X-Band frequencies and antenna tiles 1603_*a* and 1603_*b* configured to operate at Ka-Band frequencies. As another example, antenna tiles 1603_*a* and 1603_*b* configured to operate at Ka-Band frequencies are separated from one another. Further, the antenna tiles 1603_*a* and 1603_*b* are interspersed between antenna tiles 1601 configured to operate at X-Band frequencies and antenna tiles 1602_*a* and 1602_*b* configured to operate at Ku-Band frequencies. Such an interspersed antenna array configuration may be advantageous for large antenna arrays as the inclusion of antenna tiles configured for different frequency bands may allow for antenna array gains equivalent to antenna gains yielded from a large aperture.

Figure 17:
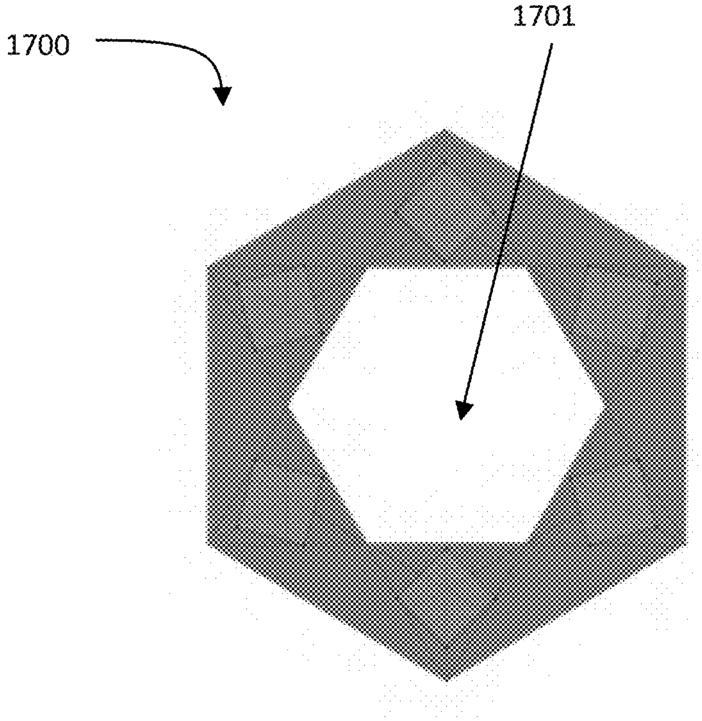
FIG. 17 illustrates an example configuration an antenna array with a central opening, in accordance with some embodiments.

FIG. 17 illustrates an example configuration an antenna array 1700 with a central opening 1701. In some example embodiments, an antenna array 1700 may be formed such that a central opening 1701 is formed in the center of the antenna array 1700. Such a configuration may allow for compact and efficient inclusion of antenna tiles, which may perform similar functions of other antenna array configurations (e.g., antenna array configurations as illustrated in FIGS. 1-3B and 11A-12B), while reducing the bulkiness of the antenna array. Furthermore, advantageously the antenna array 1700 may be lighter weight than other antenna array configurations. In some embodiments, the central opening 1701 may allow for the inclusion of one or more sensors, such as one or more multi-mode sensors, within the central opening 1701 of the antenna array 1700. The one or more sensors may include, but are not limited to, one or more image capturing devices (e.g., cameras, video recording devices, and/or the like). As such, the inclusion of one or more sensors may allow for correlation between time coincident radio frequencies and visible environmental imagery as obtained via the one or more image capturing devices.

Figure 18:
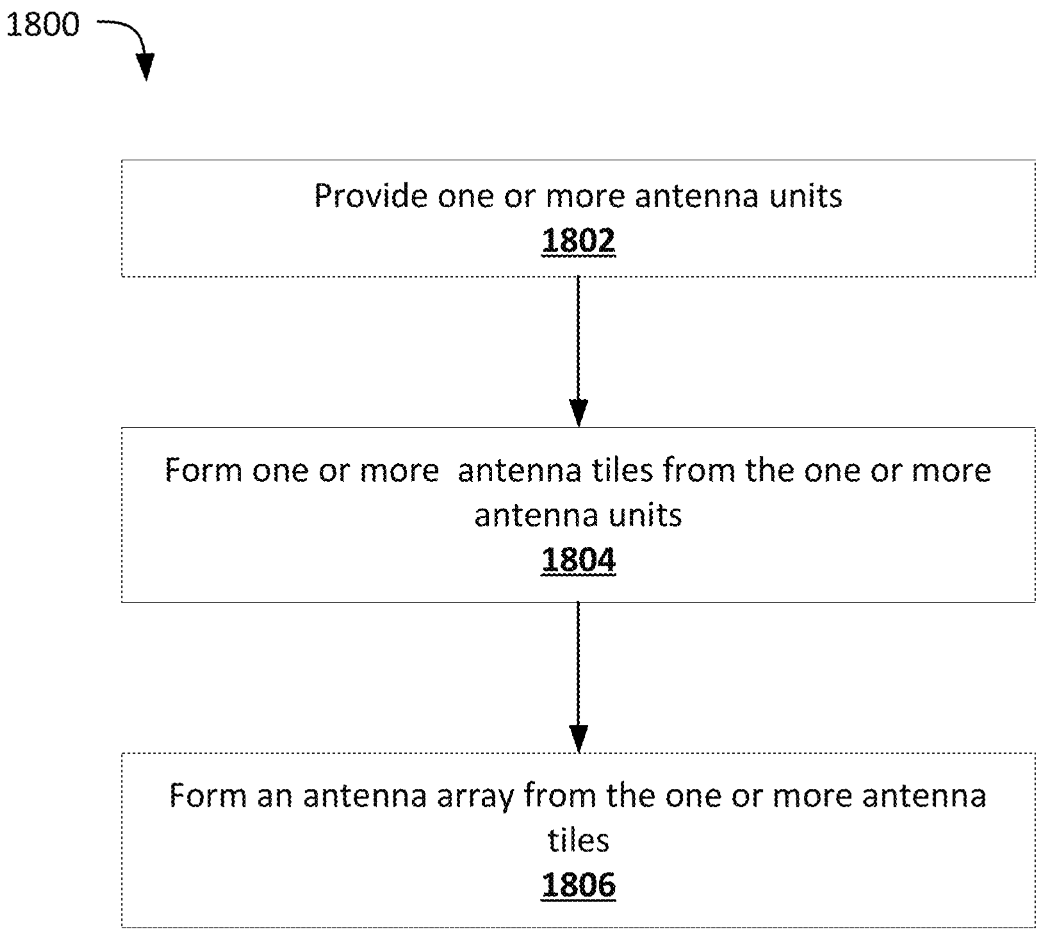
FIG. 18 illustrates a flow diagram of a method for forming an antenna array, in accordance with some embodiments.

FIG. 18 illustrates a flow diagram of a method for forming an antenna array, in accordance with some embodiments. At operation 1802, the method includes providing one or more antenna units (e.g., antenna units 120 and 800 described above with reference to FIGS. 1-2B and 8-10). In some embodiments, each antenna unit 120 can operate standalone. In other words, each antenna unit 120 can be coupled to a power and control port (e.g., SAMTEC stacker 230) or a radio frequency (RF) port (e.g. MMSP (MicroMode) 240) and controlled to operate in the desired frequency or frequency band.

The operation 1804, the method 1800 further includes forming one or more discrete antenna tiles (e.g., antenna tiles 110 described above with reference to FIGS. 1-12) from the one or more antenna units 120. In particular, as described above, the one or more discrete antenna tiles 110 are formed from tessellated antenna units 120. In some embodiments, each antenna unit 120 of a discrete antenna tile 110 can be replaced in case an individual antenna unit is damaged or malfunctioning, needs repair, needs maintained, etc. The one or more antenna units 120 forming discrete antenna tiles 110 work jointly to generate an overall result for an antenna array 100. For example, at least three antenna units 120 are tessellated together to form each of the antenna tiles 110 that operate jointly with one another. In some embodiments, each antenna tile 110 operates in one of the X-Band, Ku-Band, K-Band, Ka-Band, or W-Band frequency ranges.

At operation 1806, the method 1800 further includes forming an antenna array 100 (FIG. 1) from the one or more antenna tiles 110. In particular, as described above, the one or more discrete antenna tiles 110 are formed from tessellated antenna units 120. In some embodiments, the antenna array 100 operates in the X, Ku, K, Ka, or W-Bands. In some embodiments, the antenna array 100 provides an antenna plane. The one or more discrete antenna tiles 110 and/or the one or more antenna units 120 are optionally coupled to the antenna plane.

In an aspect of this application, an antenna 100 includes an antenna unit 120 having a polygon shape (e.g., a pentagon shape and a rhombus shape) that is configured to form the basis of a monohedral tiling arrangement of identical antenna units. In some embodiments, the antenna unit 120 has a convex polygon shape. In some embodiments, the antenna unit 120 has a concave polygon shape. In some embodiments, the antenna unit 120 is a single antenna unit. In some embodiments (FIG. 2C), the antenna unit 120 is a first antenna unit 120*a*, and the antenna further includes one or more antenna units 120*b* or 120*c* substantially identical to the first antenna unit 120*a*. In some embodiments, the antenna tile 110 further includes antenna units 120 that are tessellated with one another so as to form discrete antenna tiles 110. In some embodiments, the antenna array 100 further includes antenna tiles 110 that are tessellated with one another.

In the antenna array 100, the antenna tiles 110 are disposed close to one another without leaving an unfilled open area (e.g., greater than a threshold size) between any adjacent antenna tiles 110 and on a footprint of the antenna array 100. In some embodiments, each antenna tile 110 only includes three antenna units 120*a*-120*c* that fit into and fill the antenna tile 110, i.e., without leaving an unfilled open area (e.g., greater than a threshold size) on the antenna tile 110. Each antenna unit 120 is a smallest unit that is repeated in the antenna array 100, and has a number of sides less than six. In some embodiments, the number of sides of each antenna unit 120 is more than 3. For example, the number of sides of each antenna unit 120 is specifically 4 (rhombus) or 5 (pentagon). That said, in some embodiments, each antenna tile 110 of a hexagon shape is made of rhombus-shaped or pentagon-shaped antenna unit 120.

In some embodiments, each antenna tile 110 includes a plurality of antenna units 120*a*-120*c* that have the same size and different orientations with respect to a center or side of the antenna tile 110. The antenna circuit chips 130 are disposed at the same location with the same orientation on the antenna units 120. However, given the different orientations of the antenna units 120 in the antenna tile 110, the antenna circuit chips 130 in the antenna units 120 are also oriented differently with respect to a center or side of the antenna tile 110.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. An antenna tile comprising:

one or more antenna units, wherein:

each antenna unit has a pentagonal shape, and the antenna tile has a hexagonal shape formed by tessellating the one or more antenna units with one another.

2. The antenna tile of claim 1, wherein the one or more antenna units comprise:

a first antenna unit;

a second antenna unit; and a third antenna unit, wherein:

the second antenna unit is substantially identical to the first antenna unit; and the third antenna unit is substantially identical to the first antenna unit and second antenna units.

3. The antenna tile of claim 1, wherein each antenna unit has a convex pentagonal shape and the antenna tile has a convex hexagonal shape.

4. The antenna tile of claim 1, wherein the pentagon shape of an antenna unit has a surface area that comprises one third of the hexagonal shape of the antenna tile.

5. The antenna tile of claim 1, wherein each antenna unit comprises one or more antenna circuit chips and each antenna circuit chip comprises one or more antenna elements.

6. The antenna tile of claim 5, wherein the antenna circuit chip is disposed such that:

a first corner is disposed adjacent to a corner of the antenna unit and the corner of the antenna unit corresponds to a corner at a center of the antenna tile, and a second corner is disposed adjacent to a middle point of a side of the antenna unit corresponding to the side opposite the center of the antenna tile.

7. The antenna tile of claim 5, wherein the antenna circuit chip is disposed such that:

a first side is disposed adjacent to a corner of the antenna unit and the corner of the antenna unit corresponds to a corner at a center of the antenna tile, and a second side is disposed adjacent to and substantially parallel to a middle point of a side of the antenna unit corresponding to the side opposite the center of the antenna tile.

8. The antenna tile of claim 1, wherein:

each antenna unit is configured with a heat sink, and the heat sink comprises:

one or more fluid cooling inlets;

one or more fluid cooling outlets;

a fluid cooling chamber; and one or more fluid channels fluidically coupled to the one or more fluid cooling inlets, the fluid cooling outlet, and the fluid cooling chamber.

9. An antenna array comprising:

one or more antenna tiles, wherein:

the one or more antenna tiles are arranged on an antenna plane, each antenna tile comprises one or more antenna units that are arranged together to form the respective antenna tile having a hexagonal shape, each antenna unit comprises an antenna circuit chip, and each antenna unit has a pentagonal shape.

10. The antenna array of claim 9, wherein each antenna tile comprises three separate and distinct antenna units tessellated together.

11. The antenna array of claim 9, wherein:

each antenna tile has a convex hexagonal shape.

12. The antenna array of claim 9, wherein the antenna plane is curved in one or more dimensions.

13. The antenna array of claim 9, wherein the antenna array has a scan angle up to positive 60 degrees or negative 60 degrees off an associated boresight.

14. The antenna array of claim 9, wherein the antenna array has a half-power beam width (HPBW) less than 6 degrees.

15. The antenna array of claim 9, wherein:

the antenna array comprises at least a first antenna tile and a second antenna tile, and the first antenna tile and second antenna tile have substantially the same dimensions.

16. The antenna array of claim 9, wherein:

the antenna array comprises at least a first antenna tile and a second antenna tile, and the first antenna tile and second antenna tile have different dimensions.

17. An antenna, comprising:

an antenna unit having a pentagonal shape that is configured to form a basis of a monohedral tiling arrangement of identical antenna units;

one or more additional antenna units substantially identical to the antenna unit, wherein the antenna unit and the one or more additional antenna units are tessellated with one another so as to form discrete antenna tiles, and wherein each of the discrete antenna tiles has a hexagonal shape.

18. The antenna of claim 17, the antenna unit having a convex polygon shape.

19. The antenna of claim 17, the antenna unit having a concave polygon shape.

20. The antenna of claim 17, wherein each discrete antenna tile is tessellated with one or more other antenna tiles so as to form a discrete antenna array.

* * * * *